US011780469B1

(12) United States Patent
Roy

(10) Patent No.: US 11,780,469 B1
(45) Date of Patent: Oct. 10, 2023

(54) UNMANNED AUTONOMOUS RECHARGING VEHICLE AND SYSTEM OF RECHARGING ELECTRIC VEHICLE

(71) Applicant: Matthew MacGregor Roy, Ottawa (CA)

(72) Inventor: Matthew MacGregor Roy, Ottawa (CA)

( * ) Notice: Subject to any disclaimer, the term of this patent is extended or adjusted under 35 U.S.C. 154(b) by 374 days.

(21) Appl. No.: 17/227,329

(22) Filed: Apr. 11, 2021

Related U.S. Application Data

(60) Provisional application No. 63/015,466, filed on Apr. 24, 2020.

(51) Int. Cl.
*B60W 60/00* (2020.01)
*B60L 53/16* (2019.01)
*B60L 53/18* (2019.01)
*B60L 53/30* (2019.01)
*B60L 53/37* (2019.01)
*B60L 53/35* (2019.01)
*B60L 53/66* (2019.01)
(Continued)

(52) U.S. Cl.
CPC ......... *B60W 60/0025* (2020.02); *B60L 53/16* (2019.02); *B60L 53/18* (2019.02); *B60L 53/305* (2019.02); *B60L 53/35* (2019.02); *B60L 53/37* (2019.02); *B60L 53/53* (2019.02); *B60L 53/665* (2019.02); *B60W 10/18* (2013.01); *B60W 10/20* (2013.01); *G06Q 10/06311* (2013.01); *B60W 2420/42* (2013.01); *B60W 2556/60* (2020.02); *B60W 2720/106* (2013.01)

(58) Field of Classification Search
CPC .. B60W 60/0025; B60W 10/18; B60W 10/20; B60W 2556/60; B60W 2420/42; B60W 2720/106; B60L 53/53; B60L 53/305; B60L 53/35; B60L 53/665; B60L 53/16; B60L 53/37; B60L 53/18; G06Q 10/06311
USPC .......................................................... 701/22
See application file for complete search history.

(56) References Cited

U.S. PATENT DOCUMENTS 9,786,961 B2 * 10/2017 Dyer ..................... B60L 53/302
11,567,503 B1 * 1/2023 Roy ................... G01C 21/3492
(Continued)

FOREIGN PATENT DOCUMENTS

WO WO-2020176860 A1 * 9/2020 ............. B60L 53/12
WO WO-2020219366 A1 * 10/2020 ............. B62K 19/30
WO WO-2020232315 A1 * 11/2020

*Primary Examiner* — Tuan C To

(57) ABSTRACT

A vehicle recharging system recharges a partially depleted battery of a moving electric vehicle. The system includes a dispatch server receiving a route from the electric vehicle as well as first and second segments along the route where the electric vehicle is to be recharged first and second times. First and second unmanned autonomous recharging vehicles (UARV's) receive from the dispatch server first and second rendezvous locations along the first and second segments of the route. The dispatch server determines an adjusted second rendezvous location for the second UARV in response to determining that the first UARV is delayed and determines if the second UARV still has sufficient range to recharge the electric vehicle when commencing at the adjusted second rendezvous location. The dispatch server transmits the adjusted second rendezvous location to the second UARV to intercept the electric vehicle at the adjusted second rendezvous location.

17 Claims, 24 Drawing Sheets

(51) Int. Cl.
*B60W 10/20* (2006.01)
*B60W 10/18* (2012.01)
*G06Q 10/0631* (2023.01)
*B60L 53/53* (2019.01)

(56) References Cited

U.S. PATENT DOCUMENTS

| | | | | |
|---|---|---|---|---|
| 2020/0317067 | A1* | 10/2020 | Miller | H02J 7/0047 |
| 2020/0317074 | A1* | 10/2020 | Miller | G01C 21/3664 |
| 2020/0317077 | A1* | 10/2020 | Schaffer | B60L 53/305 |
| 2022/0300915 | A1* | 9/2022 | Lu | G06Q 10/30 |
| 2023/0150394 | A1* | 5/2023 | Diamond | G01C 21/3889 |
| | | | | 701/22 |

* cited by examiner

UNMANNED AUTONOMOUS RECHARGING VEHICLE AND SYSTEM OF RECHARGING ELECTRIC VEHICLE

CROSS-REFERENCE TO RELATED APPLICATIONS

This application claims priority from U.S. Provisional Patent Application 63/015,466 entitled "UNMANNED AUTONOMOUS RECHARGING VEHICLE AND SYSTEM OF RECHARGING ELECTRIC VEHICLE" filed Apr. 24, 2020.

TECHNICAL FIELD

The present invention relates generally to autonomous vehicles and, in particular, to autonomous recharging vehicles for recharging moving vehicles.

BACKGROUND

Electric vehicles powered by rechargeable batteries must stop periodically to be recharged which is particularly inconvenient on long trips. Even with access to superchargers, the downtime waiting for an electric vehicle (EV) to recharge is an inconvenience to many. Various technologies are proposed to recharge electric vehicles while driving. Some technologies propose wireless power transfer from electrified roads. Electrified roads are expensive to construct and some passengers may be concerned about the long-term health risks of being exposed to electromagnetic fields. Vehicle-to-vehicle (V2V) recharging has also been proposed. However, V2V recharging gives rise to issues of coordination and availability, i.e. it may be challenging in practice to find a nearby vehicle traveling the same direction whose user is willing to supply electric power by depleting his own range and who is also willing to remain connected to the depleted vehicle for the period of time needed to recharge.

Accordingly, it is highly desirable to provide a new technology for recharging an electric vehicle while driving that addresses at least some of the deficiencies of the prior art.

SUMMARY

In general, the present invention provides an unmanned autonomous recharging vehicle and a vehicle recharging system involving one or more unmanned autonomous recharging vehicles for rendezvousing with an electric vehicle driving along a route to recharge the electric vehicle while driving.

An aspect of the disclosure is an unmanned autonomous recharging vehicle (UARV) for recharging a partially depleted battery of a moving electric vehicle. The unmanned autonomous recharging vehicle includes a chassis, a power plant supported by the chassis, an energy supply supported by the chassis for supplying energy to the power plant, a plurality of wheels rotationally mounted to the chassis, at least one of which is powered by the power plant, a plurality of sensors for sensing surroundings of the unmanned autonomous recharging vehicle to enable road tracking and collision avoidance, a global navigation satellite system (GNSS) receiver for determining a current location of the unmanned autonomous recharging vehicle to enable navigation, and an autonomous driving processor coupled to the plurality of sensors and to the GNSS receiver for autonomously driving the unmanned autonomous recharging vehicle. The UARV has a recharging battery supported by the chassis, wherein the recharging battery stores an electric charge for recharging the partially depleted battery of the electric vehicle. The UARV has a radiofrequency transceiver to receive a recharging request from the electric vehicle, the recharging request comprising a projected route for the electric vehicle, battery status information for the partially depleted battery and time information indicating when the electric vehicle is traversing the projected route. The UARV includes a processor communicatively coupled to the radiofrequency transceiver to receive and process the recharging request data to determine a rendezvous location along the projected route, an estimated recharging time to recharge the electric vehicle, a predicted disconnection point along the projected route where charging is predicted to be complete, and a return path from the predicted disconnection point to an electric charging station where the unmanned autonomous recharging vehicle can recharge the recharging battery. The processor determines if the unmanned autonomous recharging vehicle has sufficient energy supply to recharge the electric vehicle and return to the electric charging station. The UARV further includes an electric power transfer device connected to the recharging battery and having a switch to transfer electric power from the recharging battery of the unmanned autonomous recharging vehicle to the partially depleted battery of the electric vehicle.

In one embodiment, the processor is configured to cause the radiofrequency transceiver to transmit the rendezvous location and the predicted disconnection point to the electric vehicle based on real-time traffic data and to receive a confirmation in reply from the electric vehicle.

In one embodiment, the processor is configured to cause the radiofrequency transceiver to transmit a detour proposal as an alternate route to the electric vehicle to minimize energy consumption to enable the unmanned autonomous recharging vehicle to return to the electric charging station and to receive a detour confirmation from the electric vehicle that the electric vehicle will take a detour.

Another aspect of the disclosure is a vehicle recharging system for recharging a partially depleted battery of an electric vehicle while the electric vehicle is driving. The vehicle recharging system includes a dispatch server having a server processor, a server memory and a server communication port for receiving a projected route from the electric vehicle and a first segment along the route where the partially depleted battery of the electric vehicle is to be recharged a first time and a second segment further along the route where the partially depleted battery of the electric vehicle is to be recharged a second time. The system includes a first unmanned autonomous recharging vehicle (UARV) for receiving from the dispatch server a first rendezvous location along the first segment of the projected route for recharging the electric vehicle the first time. The system further includes a second unmanned autonomous recharging vehicle (UARV) for receiving from the dispatch server a second rendezvous location along the second segment of the projected route for recharging the electric vehicle the second time. The dispatch server determines an adjusted second rendezvous location for the second UARV in response to determining that the first UARV is delayed and will intercept the electric vehicle at a delayed first rendezvous location. The dispatch server determines if the second UARV still has sufficient range to recharge the electric vehicle when commencing at the adjusted second rendezvous location. The dispatch server is configured to transmit the adjusted second rendezvous location to the second UARV to instruct the second UARV to intercept the electric vehicle at the adjusted second rendezvous location.

In one embodiment, the dispatch server, upon determining that the second UARV has insufficient range, communicates a cancellation message to the second UARV and communicates a request to a third UARV to intercept the electric vehicle at the adjusted second rendezvous location.

In one embodiment, the dispatch server, upon determining that the first UARV is delayed, communicates a cancellation message to the first UARV and communicates a request to a third UARV to intercept the electric vehicle at the first rendezvous location.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
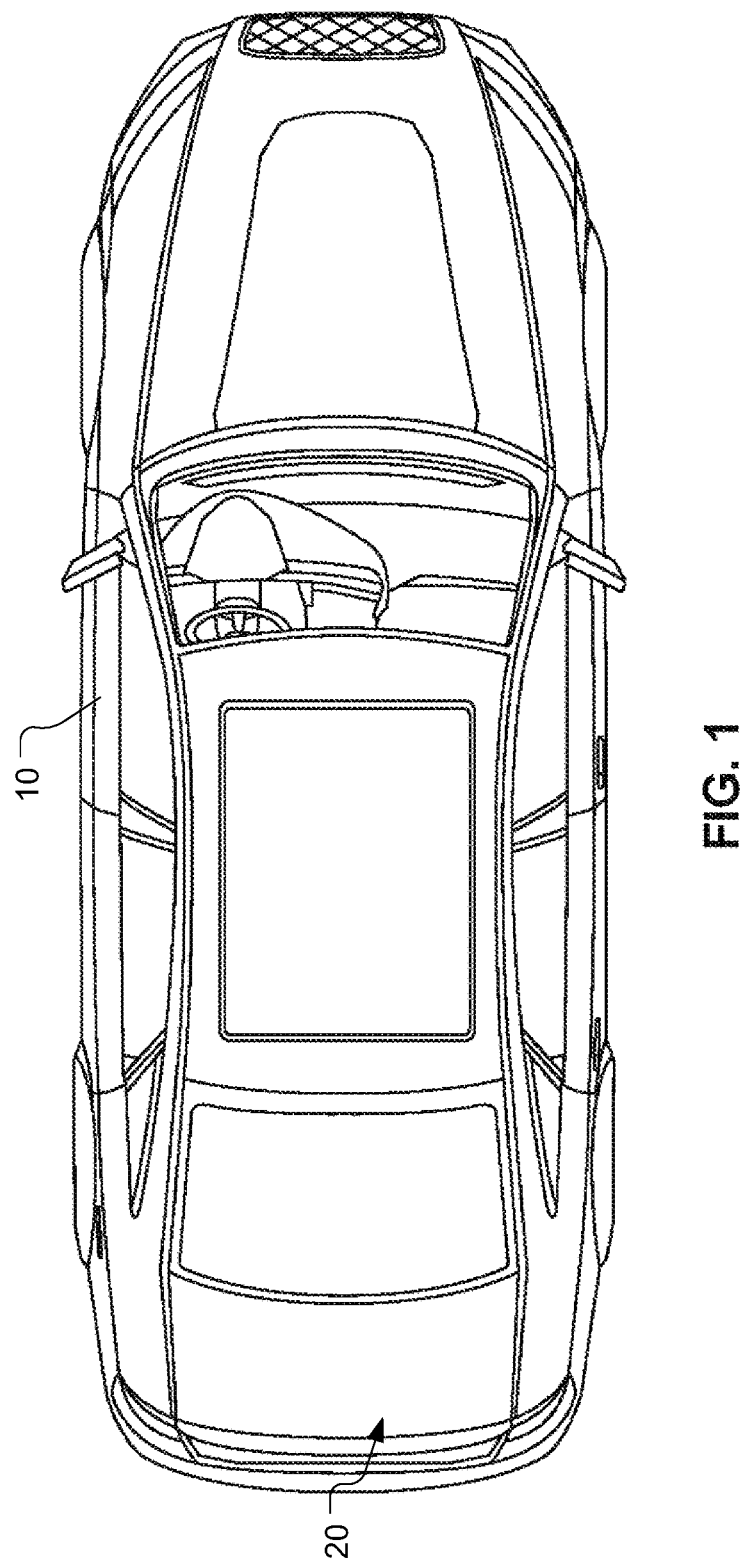
FIG. 1 is a top view of an autonomous vehicle in accordance with an embodiment of the present invention.
Figure 2:
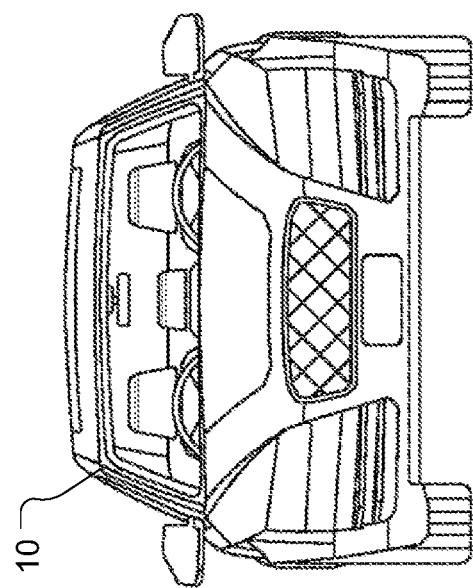
FIG. 2 is a front view of the vehicle of FIG. 1.
Figure 3:
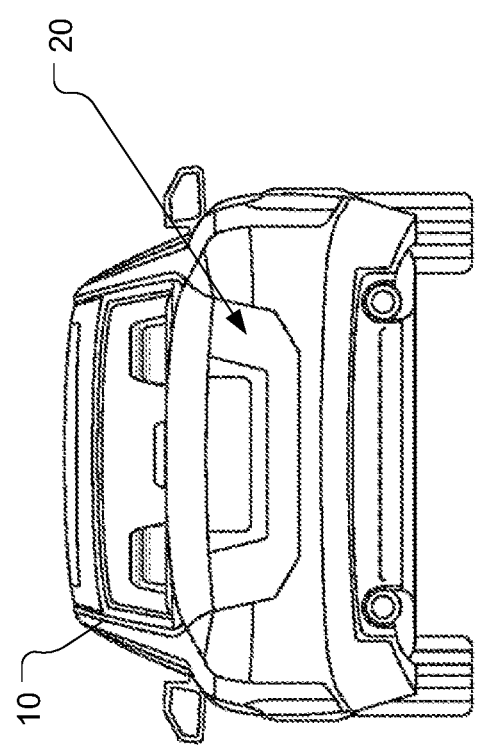
FIG. 3 is a rear view of the vehicle of FIG. 1.
Figure 4:
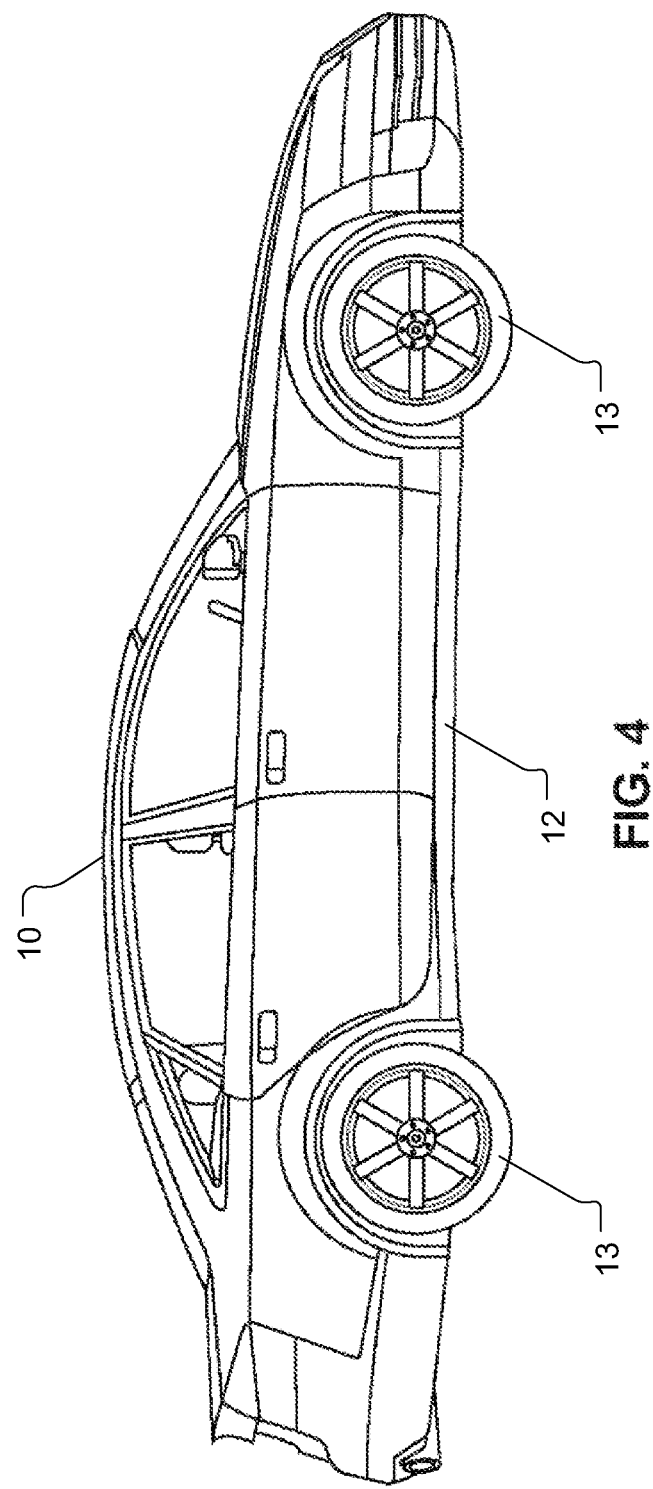
FIG. 4 is a right side view of the vehicle of FIG. 1.
Figure 5:
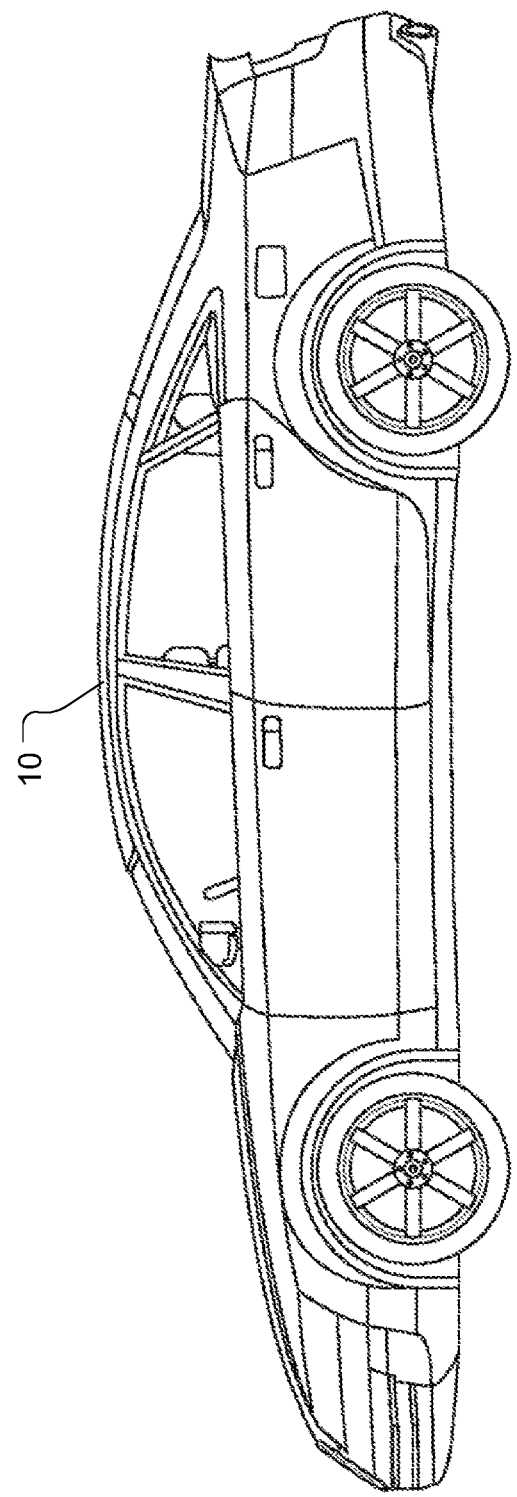
FIG. 5 is a left side view of the vehicle of FIG. 1.

Disclosed herein are various embodiments of an unmanned autonomous recharging vehicle (UARV) and a vehicle recharging system that includes two unmanned autonomous recharging vehicles for sequentially recharging an electric vehicle at two points along a route.

FIGS. 1-5 depict one exemplary implementation of an electric vehicle 10. The vehicle 10 may be an autonomous vehicle (AV), i.e. a self-driving vehicle. The embodiments of this invention may be applied or adapted to a human-driven vehicle or a mixed-mode vehicle that has an assisted-driving system for partially driving the vehicle 10 in conjunction with driver input. The autonomous vehicle 10 may be gas powered, electric, hybrid-electric, hydrogen-powered, or powered by any other means. The autonomous vehicle 10 includes, in the illustrated embodiment, a vehicle chassis 12 and a plurality of wheels 13. The vehicle 10 includes an engine or electric motor supported by the chassis and mechanically connected to one or more of the wheels for providing traction to the one or more of the wheels. The vehicle includes a braking system and a steering system for steering the vehicle via a steering mechanism. The vehicle may include a powertrain to transfer power from the motor to the drive wheels. For some vehicles, the powertrain may include, in addition to the motor (engine), a transmission gearbox, a drive shaft, and a differential. For an electric vehicle implementation, the vehicle includes a rechargeable battery or plurality of rechargeable batteries.

For the purposes of this specification, the term "autonomous vehicle" is meant to encompass any land-based vehicle such as a car (sedan, station wagon, hatchback, etc.), van, minivan, sports utility vehicle (SUV), crossover-type vehicle, bus, minibus, truck, tractor-trailer, semi-trailer.

The terms "autonomous vehicle" and "self-driving vehicle" are meant to synonymously encompass any vehicle having environment-detecting sensors and a processor, controller, computer, computing device or computer system for autonomously steering, accelerating and braking the vehicle, i.e. self-driving or driving autonomously, without a driver physically touching, interacting with or providing input to the steering wheel, accelerator pedal and brake pedal. The vehicle of FIGS. 1-5 also includes a plurality of sensors i.e. environment-detecting sensors. The sensors may include RADAR, LIDAR, cameras and ultrasonic rangefinders. The autonomous vehicle of FIGS. 1-5 further includes a processor configured to receive analog or digital signals (data) from the sensors and to generate steering, acceleration and braking control signals for controlling the steering system, the motor and the braking system of the vehicle. The processor may generate a steering control signal, an acceleration control signal and a braking control signal based on the signals received from the sensors. The processor may also generate other control signals for other subsystems and equipment on the vehicle, e.g. a turn indicator light control signal, a horn control signal, a headlight control signal, a transmission selector signal, an ignition shutoff signal, an ignition start-up signal, a door lock signal, a door unlock signal, a sunroof open signal, a sunroof close signal, a climate control signal, a seat heater signal, a windshield defroster signal, a windshield wiper activation signal, a wiper fluid squirt signal, to name but a few.

The Society of Automotive Engineers (SAE) has defined multiple levels of autonomous vehicle operation. At levels 0-2, a human driver monitors or controls the majority of the driving tasks, primarily without assistance from the vehicle. For example, at level 0 ("no automation"), a human driver is responsible for all vehicle operations. At level 1 ("driver assistance"), the vehicle occasionally assists with steering, acceleration, or braking, but the driver is still responsible for the vast majority of the vehicle control. At level 2 ("partial automation"), the vehicle controls steering, acceleration, and braking under certain circumstances without human interaction. At levels 3-5, the vehicle assumes more driving-related tasks. At level 3 ("conditional automation"), the vehicle handles steering, acceleration, and braking under certain circumstances as well as monitoring of the driving environment. Level 3 only requires the driver to intervene occasionally. At level 4 ("high automation"), the vehicle handles the same tasks as at level 3 but without relying on the driver to intervene in certain driving modes. At level 5 ("full automation"), the vehicle handle all, or almost all, tasks without any driver intervention. In the present specification, "autonomous vehicle" is meant primarily to be a level 5 vehicle although it will be appreciated that the technology described herein may be adapted or applied to vehicles having lower levels of autonomy. It will be appreciated that the UARV and vehicle recharging system may be used with vehicles operating at levels 0, 1, 2, 3, 4 and 5.

The processor may be any microprocessor, computer, computing device, or microcontroller. As will be appreciated, in a variant, there may be multiple processors or computers working together, e.g. networked together via data buses, communication cables, or wireless links to share computational loads or to perform different tasks. In one embodiment, the vehicle comprises a self-driving computer or computing device that has a microprocessor operatively coupled to a memory, e.g. a flash memory and/or random access memory (RAM). The memory may store system data, configuration files and user-related data. There may be multiple memory devices in the vehicle. In a variant, data may be stored in a cloud-based memory accessible by the vehicle.

The autonomous vehicle further includes a Global Navigation Satellite System (GNSS) receiver for receiving satellite signals and for determining a current location of the self-driving vehicle. The GNSS receiver may be a Global Positioning System (GPS) receiver that decodes satellite signals transmitted by orbiting GNSS satellites. The GNSS (or GPS) receiver may be part of the vehicle navigation system. The GNSS or GPS receiver (e.g. in the form of a chip or chipset) receives GNSS/GPS radio signals transmitted from one or more orbiting GNSS/GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including Beidou (COMPASS), Galileo, GLONASS, IRNSS, and QZSS.

The processor may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processor may be part of a computing system that includes a chipset for controlling communications between the one or more processors and one or more of the other components of the system. The one or more processors may also include one or more application-specific integrated circuits (ASICs) or application-specific standard products (ASSPs) for handling specific data processing functions or tasks.

The memory may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or any suitable combination thereof.

Figure 6:
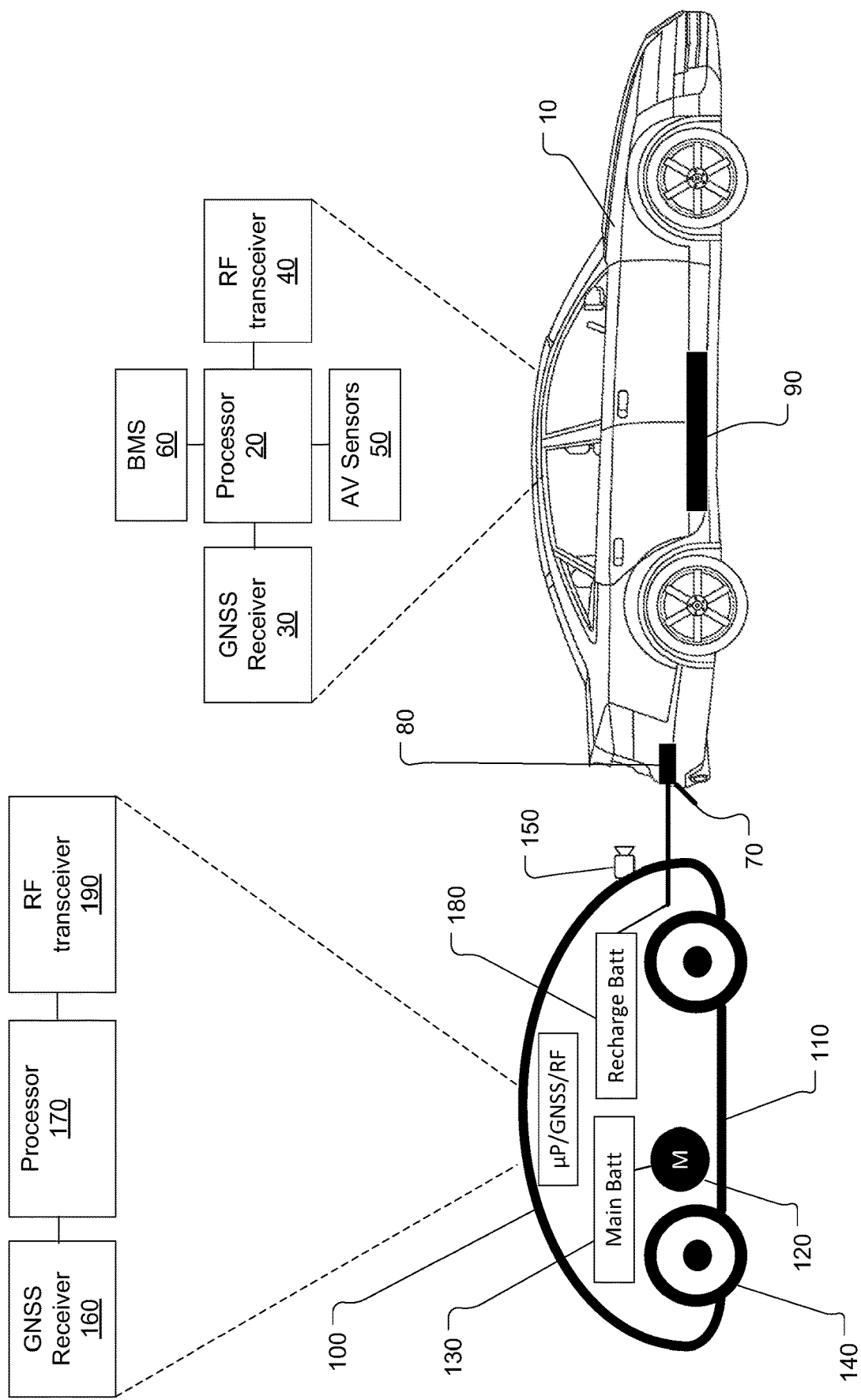
FIG. 6 depicts an unmanned autonomous recharging vehicle (UARV) recharging an electric vehicle (EV) while driving.

In the embodiment depicted in FIG. 6, an unmanned autonomous recharging vehicle generally denoted by reference numeral 100 is designed for recharging a partially depleted battery 90 of a moving electric vehicle (EV) 10 such as, for example, the autonomous vehicle 10 introduced above. In the embodiment depicted in FIG. 6, the EV 10 has a processor 20 (e.g. for self-driving), a GNSS receiver 30 (e.g. for location determination, navigation, and sending location data to call for an UARV), a radio-frequency (RF) transceiver 40 to send recharging requests and to receive data from an UARV or a dispatch server. The EV 10 includes sensors 50 (e.g. LIDAR, RADAR, cameras, etc.) for autonomous driving or other lower levels of autonomy. The EV 10 includes a battery management system (BMS) for managing the battery 90. The EV 10 in this particular embodiment has a rear charging port with an electrical socket 80 covered by a protective cover or flap 70 that is opened and closed automatically by an actuator, motor or servo.

In the embodiment depicted in FIG. 6, the unmanned autonomous recharging vehicle (UARV) 100 includes a chassis 110 (e.g. a frame or equivalent main supporting structure) and a power plant 120 supported by the chassis 110. The power plant 120 may be a gas engine, diesel engine, electric motor, hydrogen fuel cell or any equivalent motor or engine or any hybrid power system. The UARV 100 includes an energy supply 130 supported by the chassis 110 for supplying energy (e.g. in the form of electricity or fuel, for example) to the power plant 120. The energy supply 130 may be a gas tank for a gas engine, a battery pack for an electric motor, a hydrogen tank for a hydrogen fuel cell. The UARV 100 has a plurality of wheels 140, e.g. four wheels, which are rotationally mounted to the chassis. The UARV may have more than four wheels, e.g. six wheels, eight wheels, ten wheels, etc. At least one of the wheels is powered by the power plant to provide traction for the UARV. The UARV may be, for example, a two-wheel drive vehicle (front wheel drive or rear wheel drive) or a four-wheel drive vehicle. The UARV 100 includes a plurality of sensors 150 for sensing surroundings of the unmanned autonomous recharging vehicle to enable road tracking and collision avoidance. The UARV 100 includes a global navigation satellite system (GNSS) receiver 160 for determining a current location of the unmanned autonomous recharging vehicle to enable navigation. The UARV 100 has an autonomous driving processor 170 coupled to the plurality of sensors 150 and to the GNSS receiver 160 for autonomously driving the unmanned autonomous recharging vehicle 100. The UARV 100 has a recharging battery 180 supported by the chassis 110. The recharging battery 180 stores an electric charge for recharging the partially depleted battery 90 of the electric vehicle 10 as will be further described below. In the embodiment depicted in FIG. 6, the UARV 100 includes a radiofrequency transceiver 190 (e.g. 5G, LTE, GSM cellular transceiver) to receive data from a server or vehicle as will be explained in greater detail below.

Figure 7:
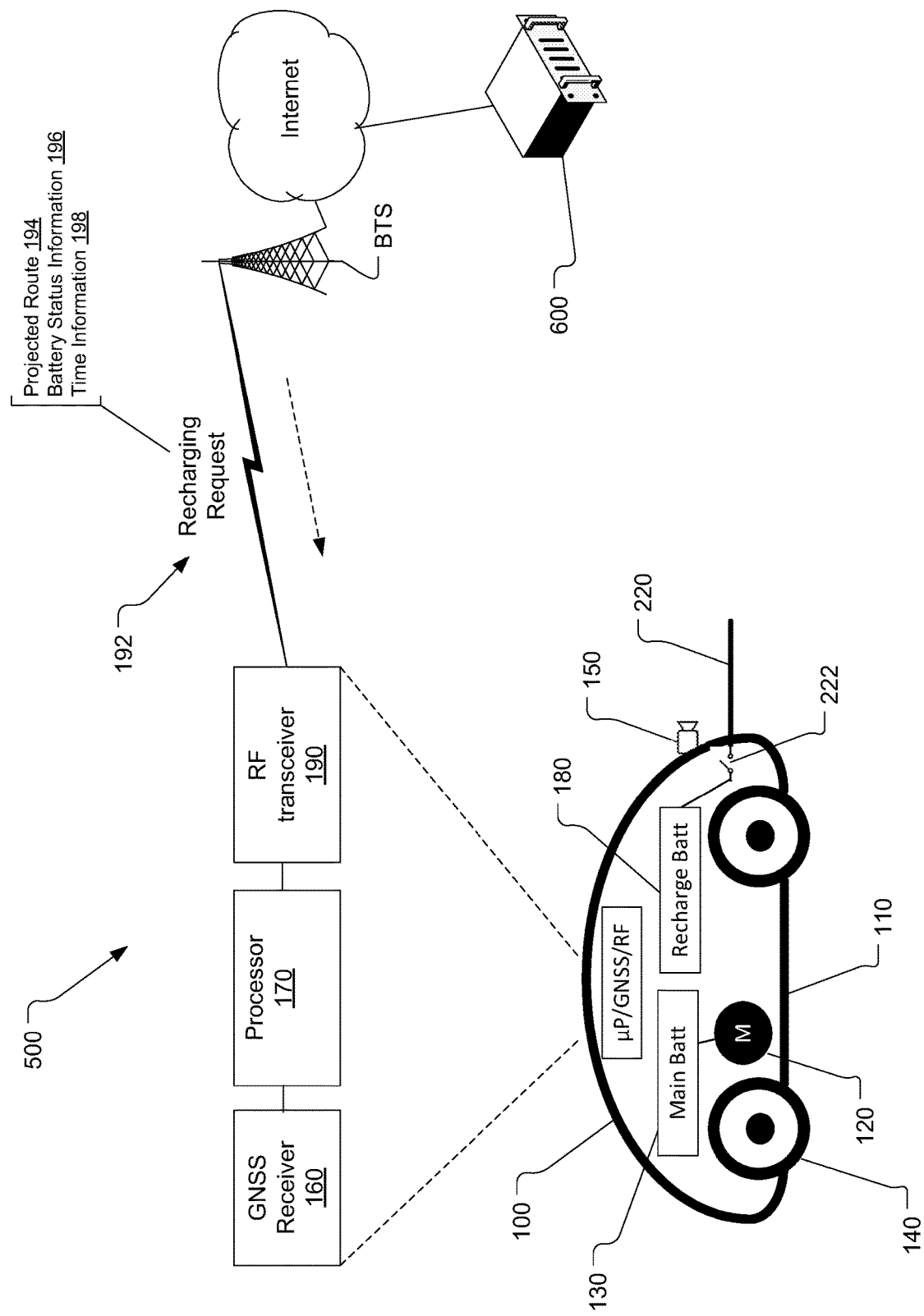
FIG. 7 depicts an unmanned autonomous recharging vehicle receiving a recharging request from a dispatch server.

In the embodiment depicted in FIG. 7, the radiofrequency transceiver 190 of the UARV 100 receives recharging request data defining a recharging request 192 from the electric vehicle 10. The recharging request 192 comprises in some embodiments a projected route 194 for the electric vehicle, battery status information 196 for the partially depleted battery and time information 198 indicating when the electric vehicle is traversing the projected route 194. The recharging request may also include a current location 195 of the EV. The recharging request 192 enables the UARV 100, or its dispatch server, to determine if it has sufficient range to recharge the electric vehicle and, if so, when and where to rendezvous (i.e. intercept or meet) the electric vehicle along the route of the electric vehicle. By sufficient range, it is generally mean that it has enough range to reach the electric vehicle, recharge it and then return to its home base or other location where the UARV itself can be replenished or recharged.

Figure 8:
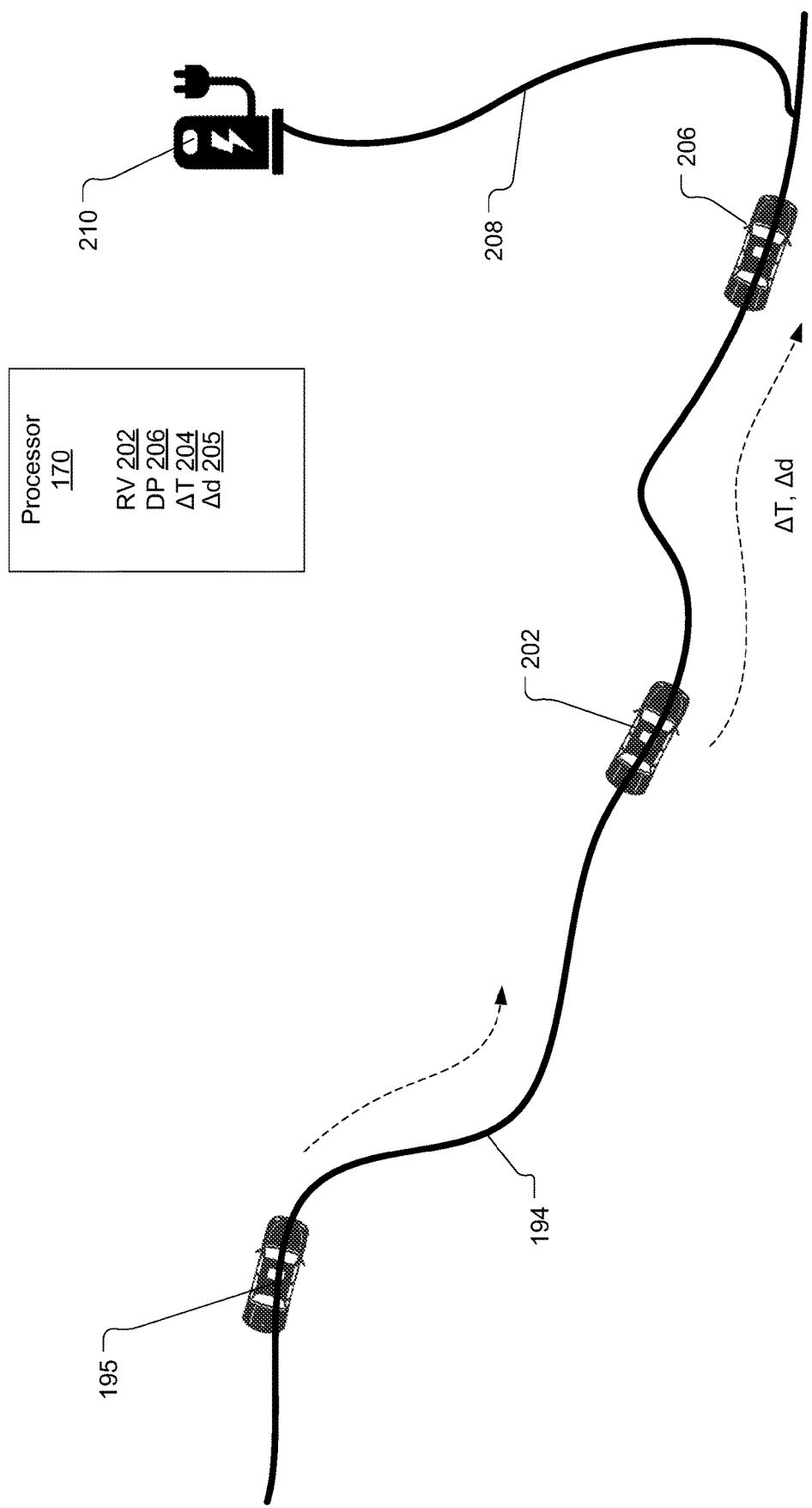
FIG. 8 depicts a projected route along which the electric vehicle (EV) is traveling, showing a rendezvous location for the UARV and the EV and a disconnection point.

In the embodiment depicted in FIG. 8, the UARV 100 includes a processor 200 (i.e. a recharger processor distinct from the autonomous driving processor 170 although the two processors 170, 200 may be combined in another embodiment as a single processor handling both functions). The processor 200 is communicatively coupled to the radiofrequency transceiver 170 to receive and process the recharging request 192, which may include the current location 195 of the EV, to determine a rendezvous location 202 along the projected route 194, an estimated recharging time 204 (and distance 205) to recharge the electric vehicle 10, a predicted disconnection point 206 along the projected route 194 where charging is predicted to be complete, and a return path 208 from the predicted disconnection point 206 to an electric charging station 210 where the unmanned autonomous recharging vehicle 100 can recharge the recharging battery 180. The processor 200 determines if the unmanned autonomous recharging vehicle 100 has sufficient energy supply to recharge the electric vehicle 10 and travel to the electric charging station 210.

Figure 9:
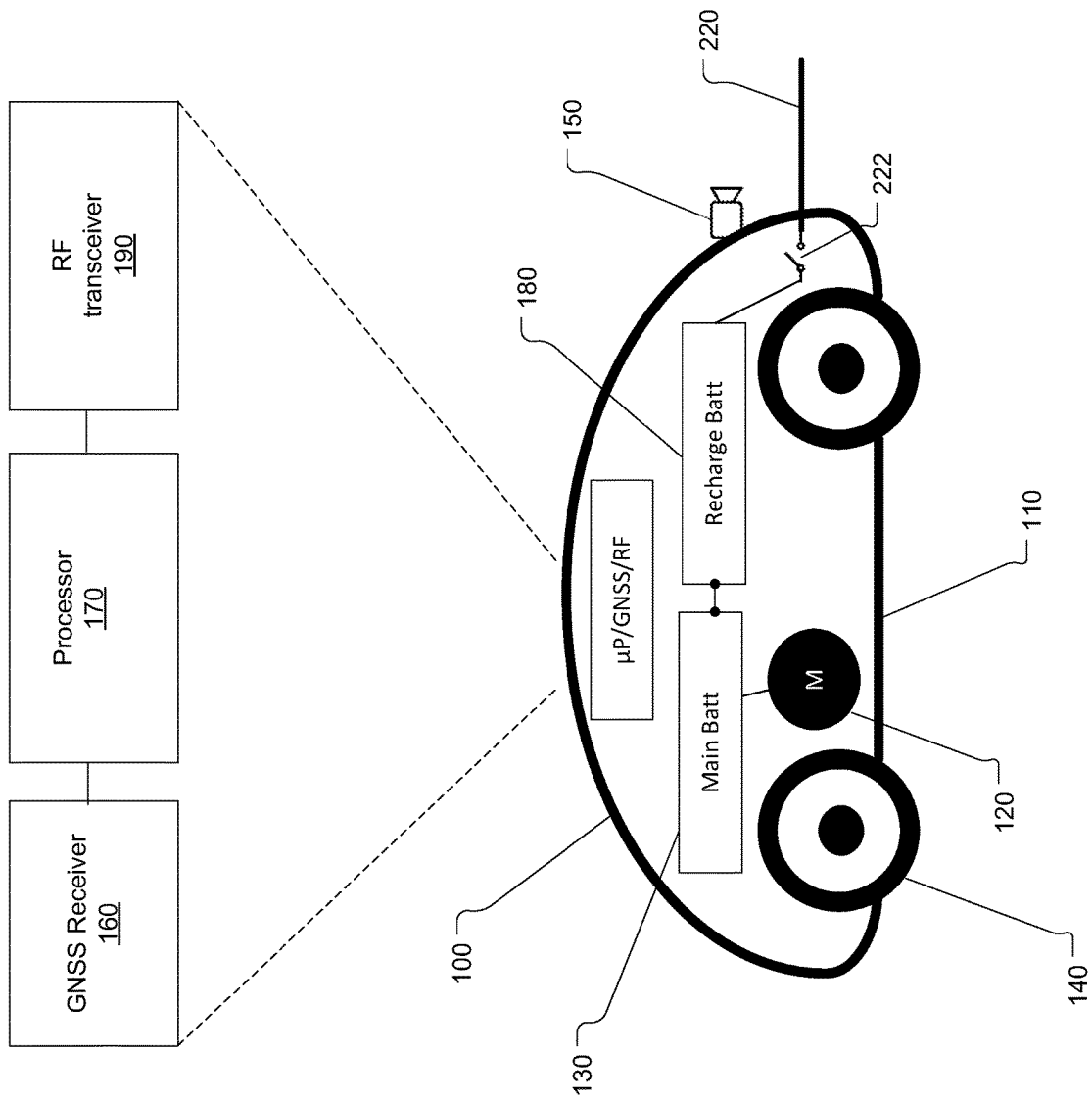
FIG. 9 depicts an unmanned autonomous recharging vehicle having an electric power transfer device and a switch to transfer electric power from the recharging battery.

As depicted in FIG. 9, the UARV 100 includes an electric power transfer device 220 connected to the recharging battery 180 and having a switch 222 to transfer electric power from the recharging battery 180 of the unmanned autonomous recharging vehicle 100 to the partially depleted battery 90 of the electric vehicle 10. In one embodiment, the UARV 100 has a main battery 130 for powering an electric motor to provide traction for the UARV in addition to the recharging battery 180. These batteries 130 and 180 may be separate batteries or they may be part of the same battery pack. In the embodiment depicted in FIG. 9, the batteries 130 and 180 may be interconnected to permit an electric charge to be conducted from one to the other to recharge one battery using the other.

Figure 10:
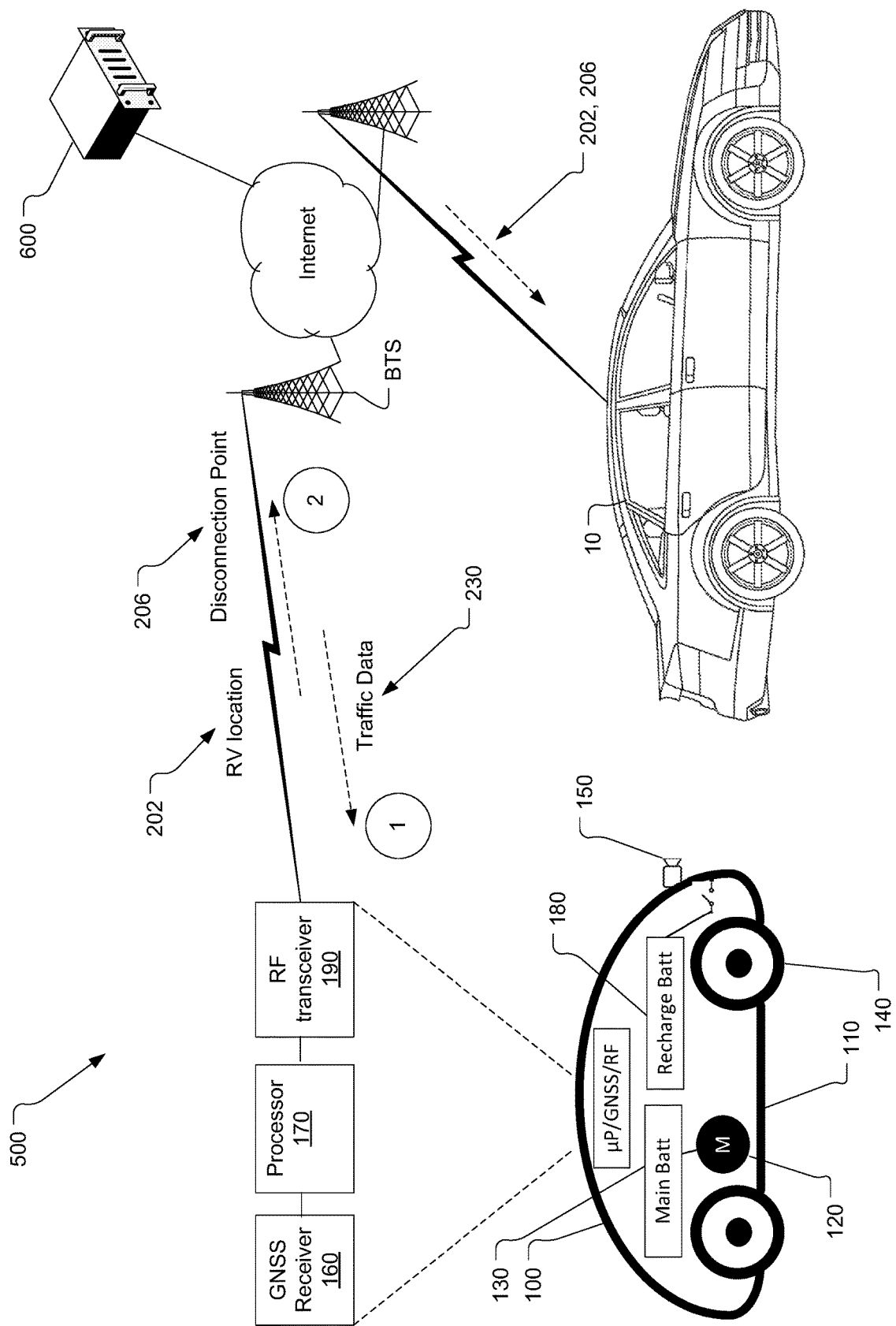
FIG. 10 depicts a vehicle recharging system in which the UARV transmits a rendezvous location to the EV in response to receiving real-time traffic data.
Figure 11:
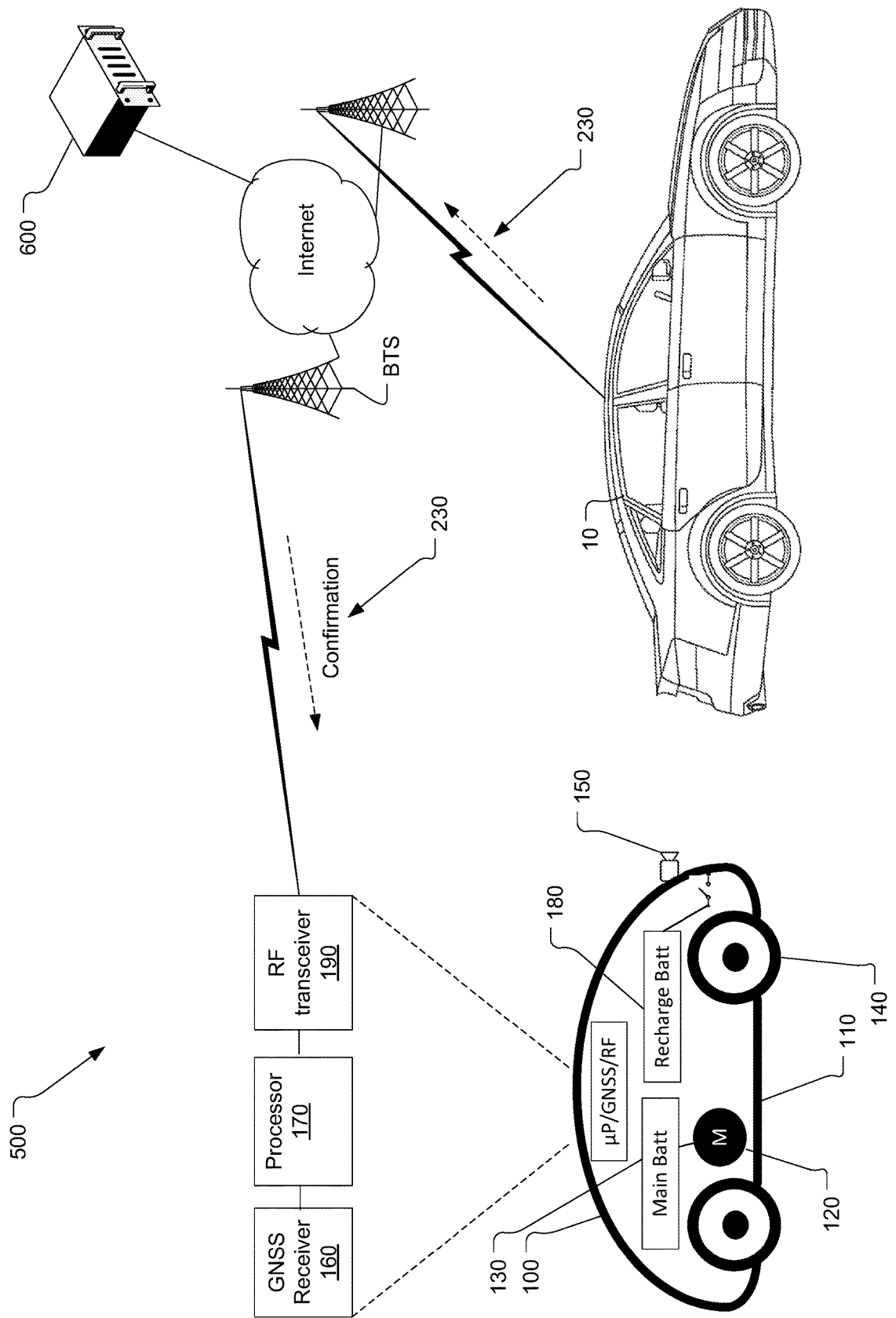
FIG. 11 depicts a vehicle recharging system in which the UARV receives a confirmation from the EV in response to transmitting the rendezvous location to the EV.

In the embodiment depicted in FIG. 10, the processor 200 of the unmanned autonomous recharging vehicle 100 is configured to cause the radiofrequency transceiver 190 to transmit the rendezvous location 202 and the predicted disconnection point 206 to the electric vehicle 10 based on real-time traffic data 230 and to receive a confirmation 240, as shown in FIG. 11, in reply from the electric vehicle (EV) 10. The confirmation indicates that the EV 10 has accepted to rendezvous with the UARV 100.

Figure 12:
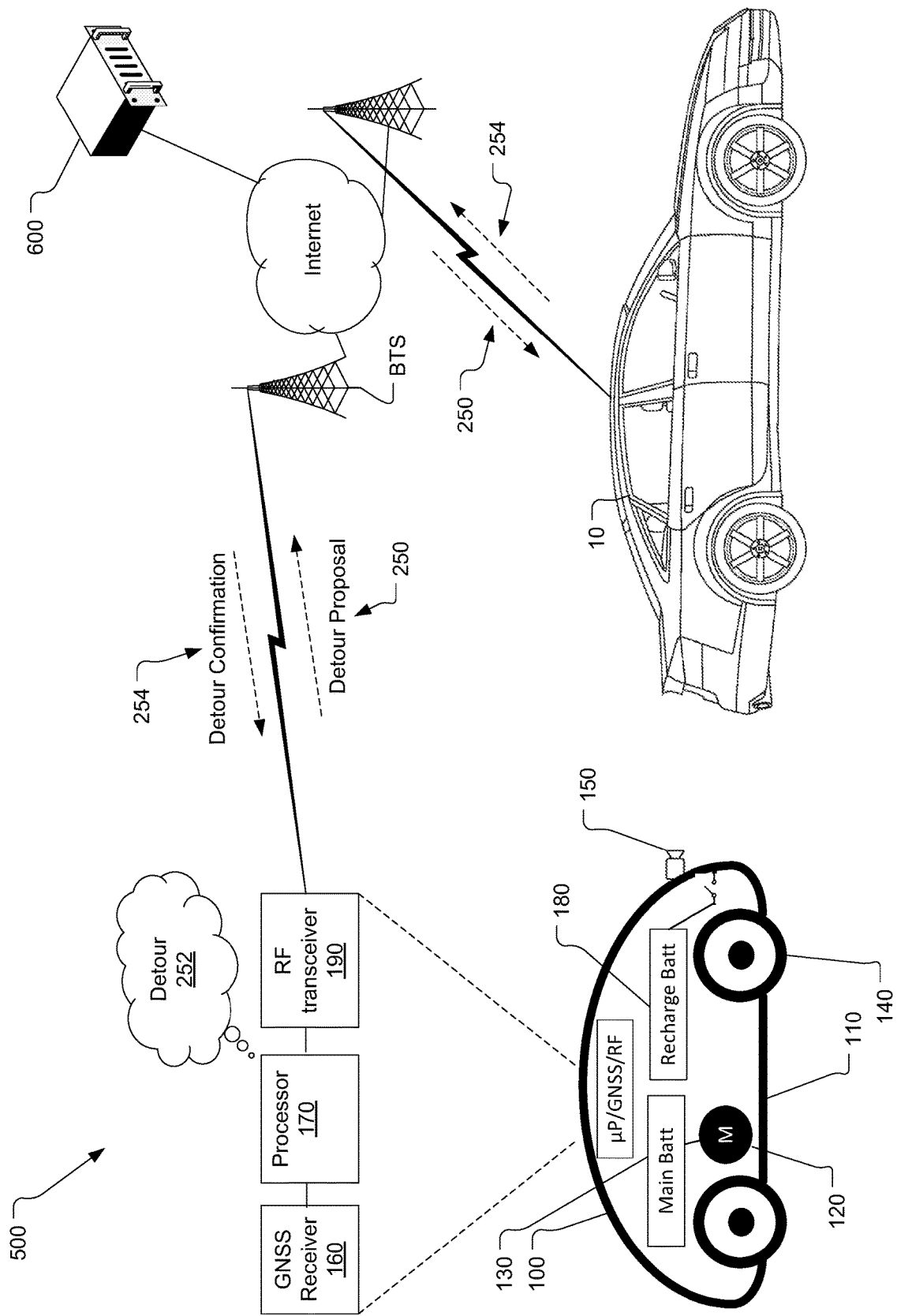
FIG. 12 depicts a vehicle recharging system in which the UARV transmits a detour proposal to the EV and receives a detour confirmation in reply from the EV.

In one embodiment, as depicted in FIG. 12, the processor 200 of the unmanned autonomous recharging vehicle 100 is configured to cause the radiofrequency transceiver 190 to transmit a detour proposal 250 as an alternate route 252 (or detour) to the electric vehicle 10 to minimize energy consumption to enable the unmanned autonomous recharging vehicle 100 to return to the electric charging station 210 and to receive a detour confirmation 254 from the electric vehicle 10 that the electric vehicle 10 will take the detour 252. In this embodiment, the electric vehicle 10 may recalculate the route to its destination using this detour or alternate route to determine if the estimated time of arrival is still acceptable given predetermined user parameters, e.g. a meeting time, event start time, etc. The electric vehicle 10 may also determine if the detour is acceptable in terms of the geographical area in which the electric vehicle will travel, e.g. a high-crime neighborhood. The electric vehicle 10 may thus accept or reject the detour proposal received from the UARV. The electric vehicle 10 may also consider whether other UARVs are available when determining whether to accept or reject the detour proposal.

Figure 13:
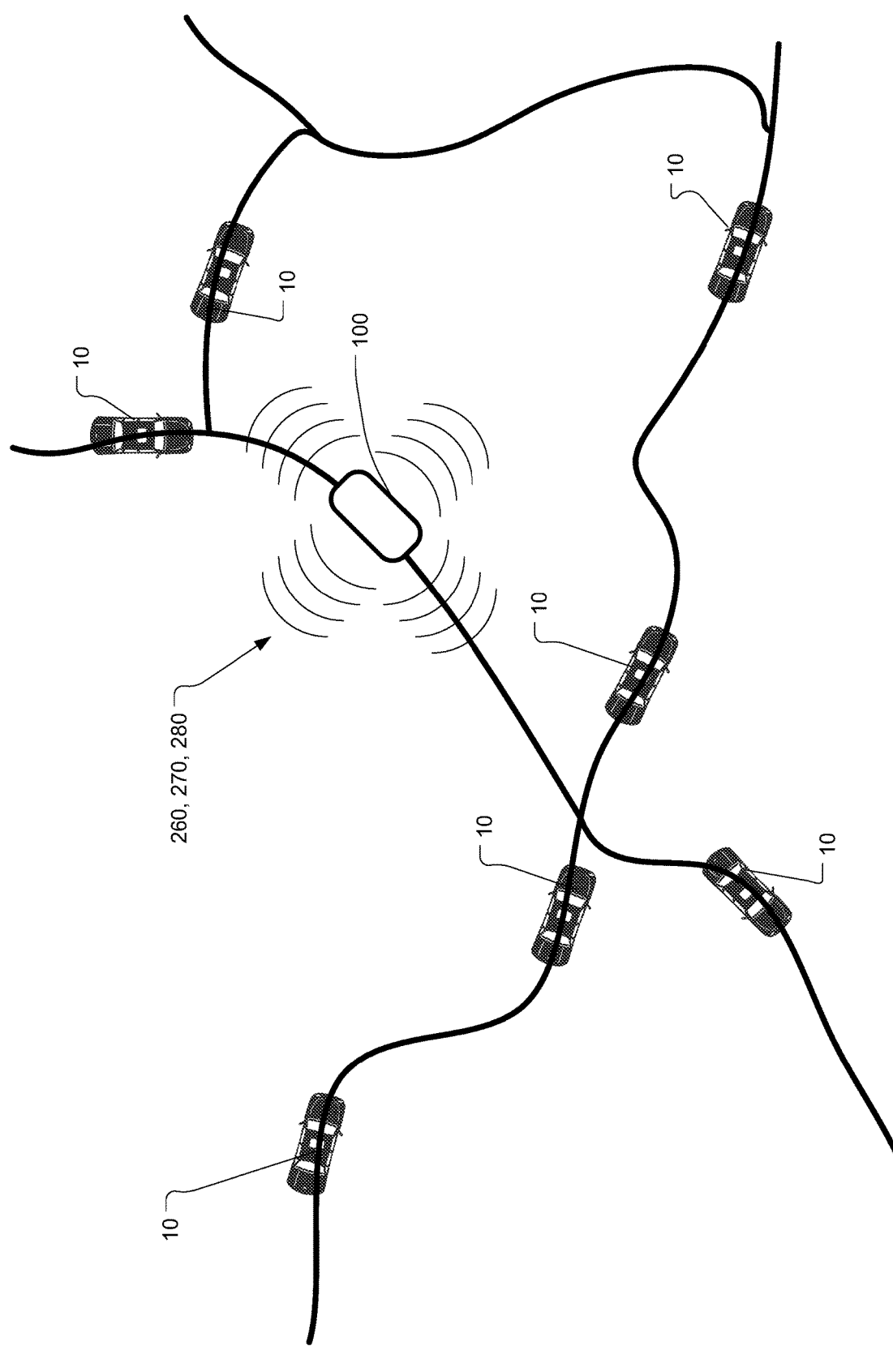
FIG. 13 depicts the UARV broadcasting its availability to nearby electric vehicles.

In one embodiment, as depicted in FIG. 13, the processor 200 of the unmanned autonomous recharging vehicle 100 is configured to cause the radiofrequency transceiver 190 to broadcast availability 260 in a geographical location and connection types 270. The connection types indicates the types of electrical connectors that are available on the UARV. The EV can determine whether its port or socket is compatible with the connection types available on the UARV. The availability in a geographical location may include a boundary or region and/or a segment of a route and may further include a direction of travel along a highway or other route, e.g. northbound on I-95 between Richmond, Virginia and Fredericksburg, Virginia. The UARV may also broadcast energy content available to transfer.

Figure 14:
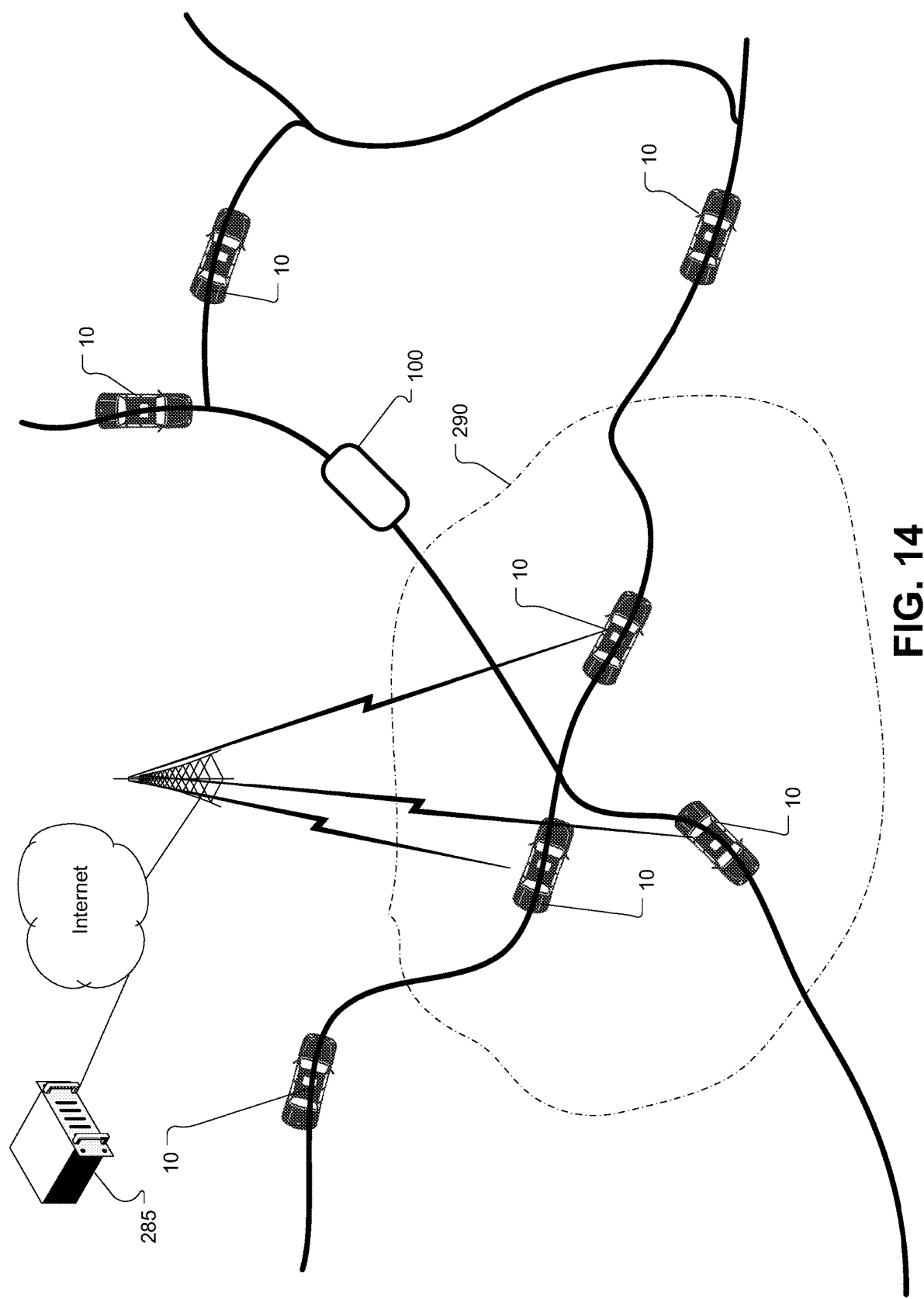
FIG. 14 depicts a location-based advertising server broadcasting location-based advertising to electric vehicles within a geofence based on the location of the UARV.

In one embodiment, as also shown in FIG. 13, the processor 170 of the unmanned autonomous recharging vehicle 100 causes the radiofrequency transceiver 190 to also broadcast a recharging price 280. The recharging price 280 may be expressed as the price per unit of energy. The recharging price 280 may be a dynamically set recharging price. The dynamically set recharging price may be set by the processor 170 or by a server cooperating with the UARV. The recharging price 280 may be dynamically set based on one or more of: a supply and demand algorithm, a distance to the rendezvous location, a charging time, a distance to return to the electric charging station, user input from an owner/operator of the UARV. The UARV may also broadcast location-based advertising (LBA), optionally with e-coupons, to electric vehicles in the vicinity as shown in FIG. 13. A server associated with the UARV or an LBA server 285 may broadcast the LBA in another embodiment. The LBA may be broadcast using an LBA geofence 290 that is set based on the range of the UARV. In other words, as shown in FIG. 14, the LBA geofence 290 is determined based on the current location, direction of travel and range of the UARV to only advertise to EV's that are presently accessible to the UARV. In this embodiment, LBA is then broadcast to EV's within the LBA geofence 290.

In one embodiment, the processor 170 of the unmanned autonomous recharging vehicle 100 receives via the radiofrequency transceiver 190 multiple recharge requests from multiple electric vehicles and determines which one of the multiple electric vehicles to recharge based on price and travel time to the rendezvous location 202.

Figure 15:
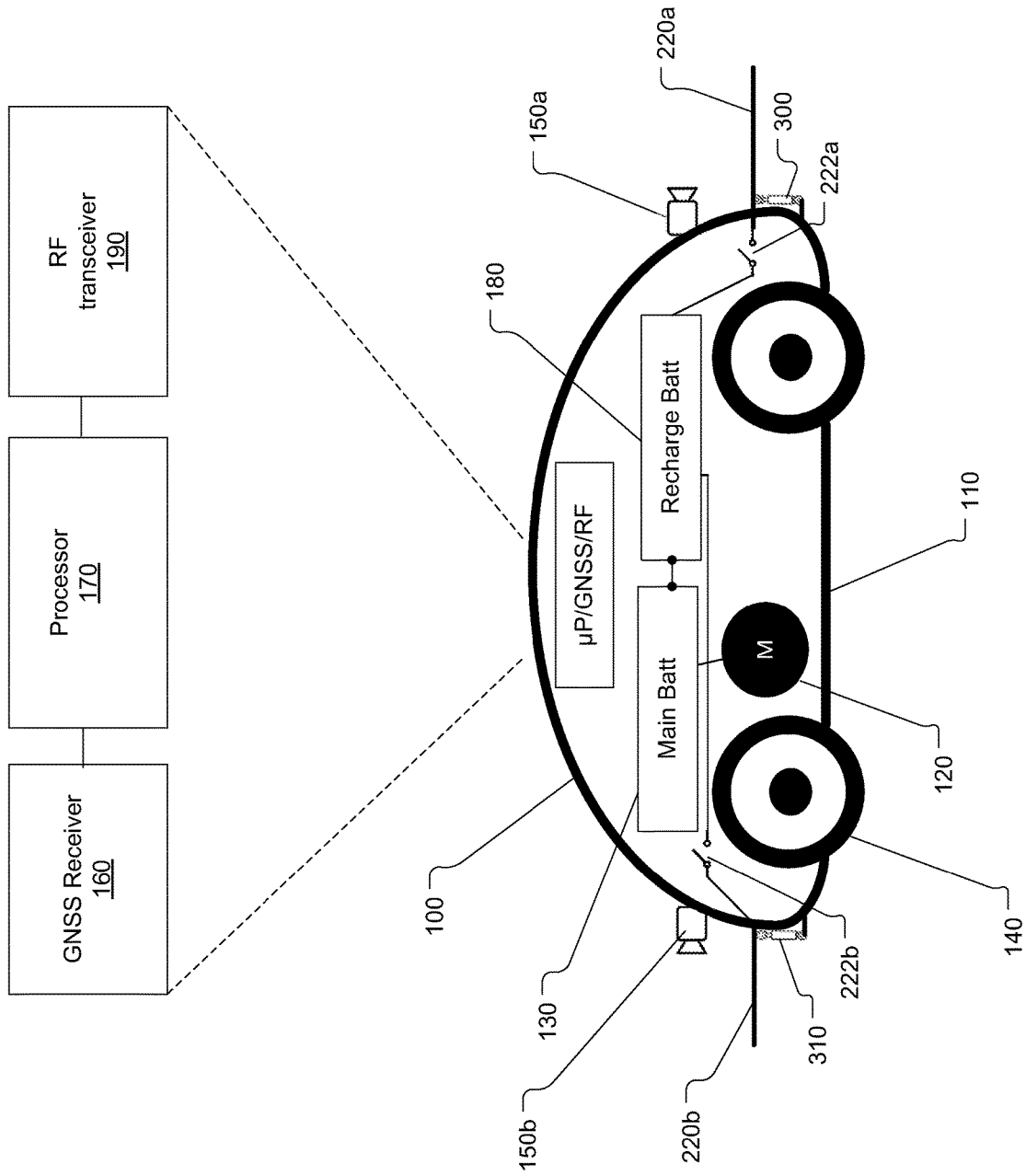
FIG. 15 depicts an unmanned autonomous recharging vehicle having front and rear vertical adjustment mechanisms for raising and lowering the front and rear electric power transfer devices.

In the embodiment depicted in FIG. 15, the unmanned autonomous recharging vehicle 100 has a front electric power transfer device 220a forwardly extendable from a front portion of the unmanned autonomous recharging vehicle and a rear electric power transfer device 220b rearwardly extendable from a rear portion of the unmanned autonomous recharging vehicle 100. In the embodiment illustrated in FIG. 15, the front electric power transfer device 220a is vertically adjustable by a front vertical adjustment mechanism 300, e.g. a front actuator. In the embodiment illustrated in FIG. 15, the rear electric power transfer device 220b is vertically adjustable by a rear vertical adjustment mechanism 310, e.g. a rear actuator. In this embodiment of FIG. 15, the front and rear electric power transfer device 220a, 220b may be independently raised or lowered to align vertically with the socket of an EV. Vertical alignment may be performed automatically in response to detecting a socket height by one of the cameras 150a, 150b. In this embodiment, the UARV 100 has a front camera 150a and a rear camera 150b for guiding the front and rear electric power transfer devices 220a, 220b. In this embodiment, the UARV 100 has a front switch 222a and a rear switch 222b for selectively discharging the recharging battery to the front and rear electric power transfer devices 220a, 220b, respectively. In one embodiment, the UARV may charge two EV's simultaneously. In this embodiment, the UARV uses the front electric power transfer device 220a to charge a first EV and uses the second electric power transfer device 220b to charge a second EV. Horizontal lateral alignment may be achieved by relative lateral movements of the UARV and/or EV, or alternatively using horizontal lateral adjustment mechanisms to lateral align the socket of the EV and plug of the UARV.

Figure 16:
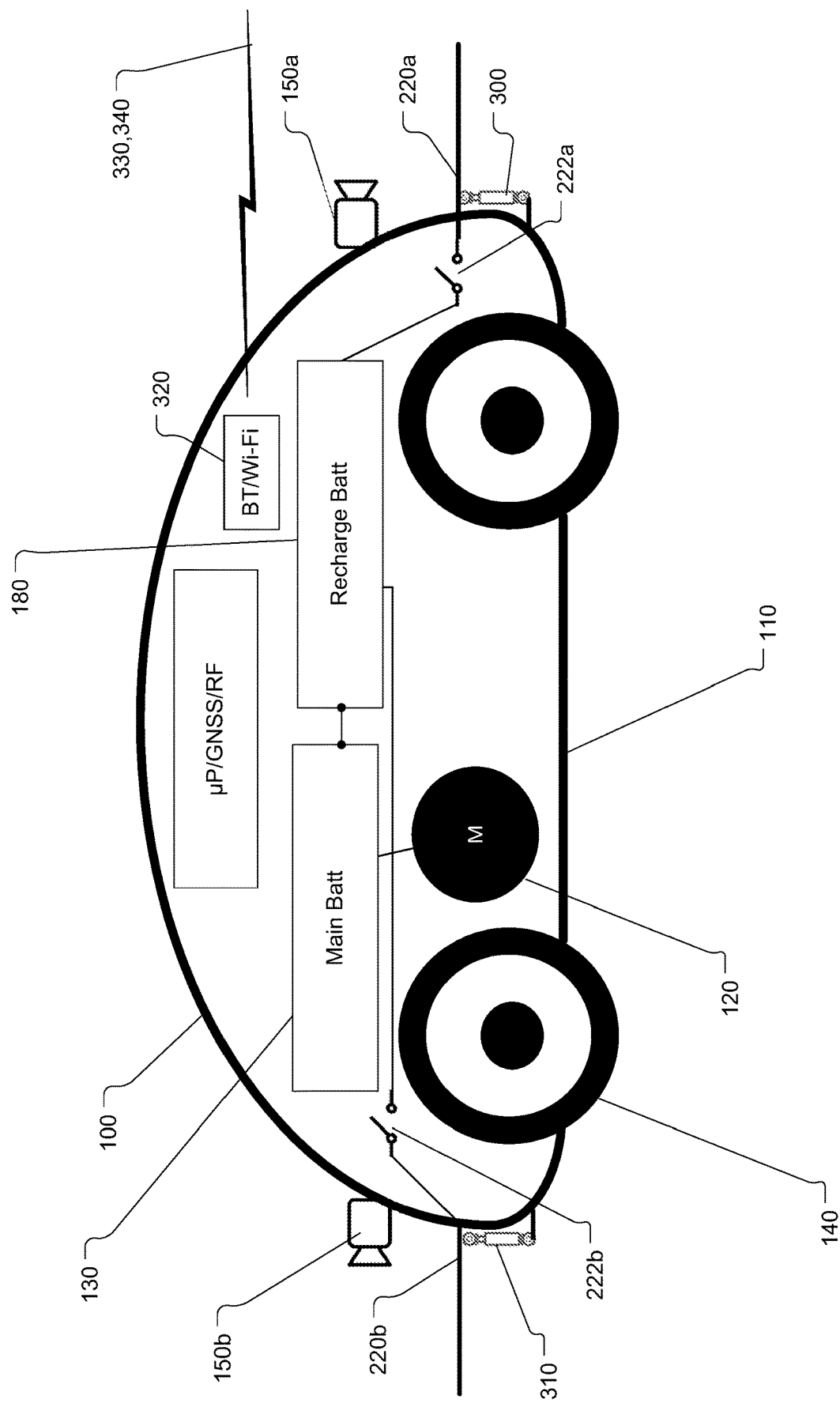
FIG. 16 depicts an unmanned autonomous recharging vehicle having a short-range wireless transceiver for a connection request message to the EV to request that a flap covering an electrical socket of the EV be opened.
Figure 17:
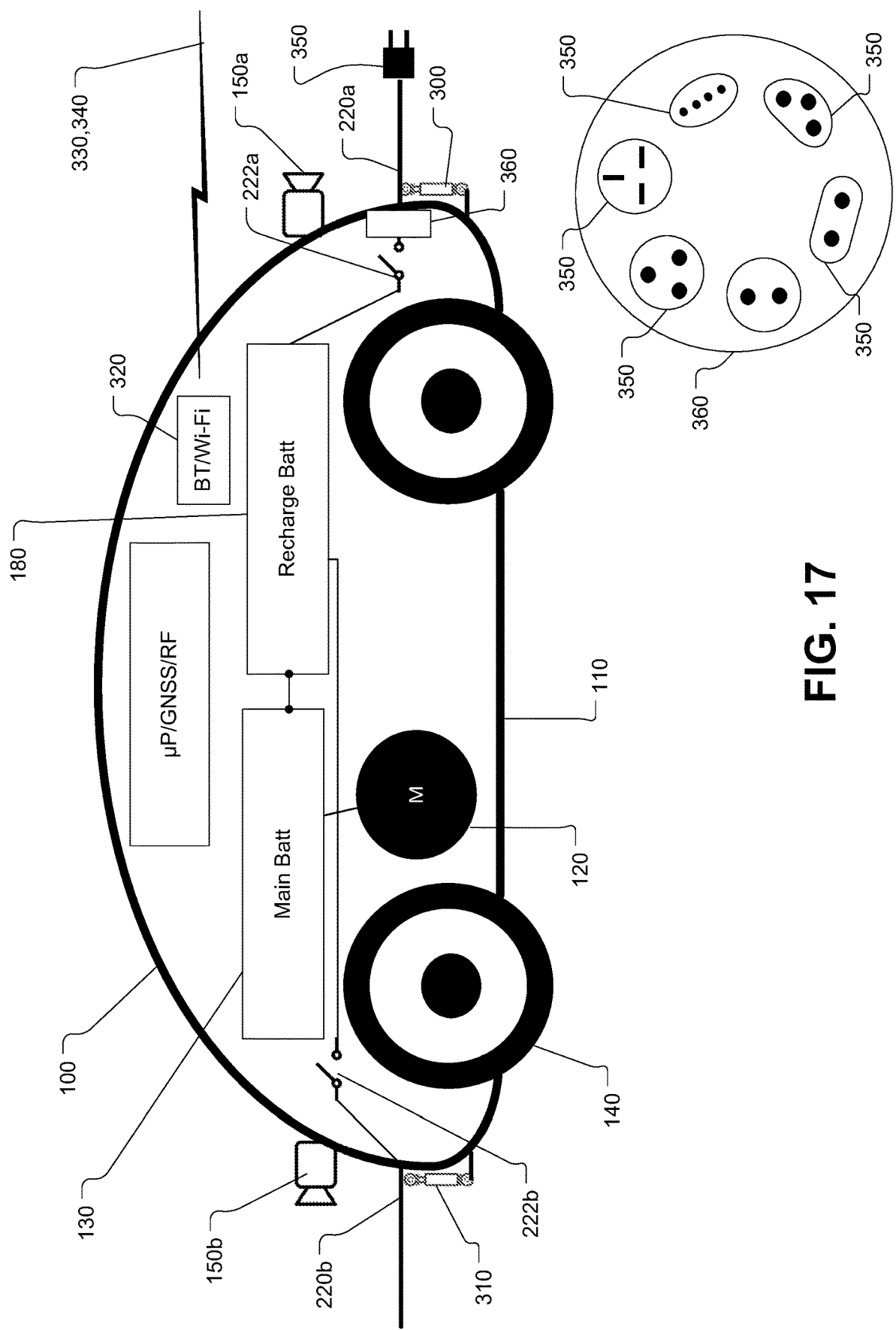
FIG. 17 depicts an unmanned autonomous recharging vehicle having a turret providing a plurality of adapters for connecting to the socket of the EV.

In one embodiment, as depicted in FIG. 16, the unmanned autonomous recharging vehicle 100 includes a short-range wireless transceiver 320 (e.g. Bluetooth® transceiver or Wi-Fi® transceiver or equivalent) for communicating a connection request message 330 to the electric vehicle 10 to request that a flap 70 covering an electrical socket 80 be opened. The EV may reply with an acknowledgment message 340. In one embodiment, the unmanned autonomous recharging vehicle 100 includes a camera 150a, 150b to visually detect that the flap 70 is open and that the electrical socket 80 is therefore accessible. The camera 150a, 150b may provide image data to the processor 200 to enable the processor 200 to verify a type of socket 80 on the electric vehicle 10. In one embodiment, as depicted in FIG. 17, the processor 200 selects an adaptor 350 from a plurality of adaptors to connect to the socket 80. A turret 360 having the plurality of adaptors may be provided.

Figure 18:
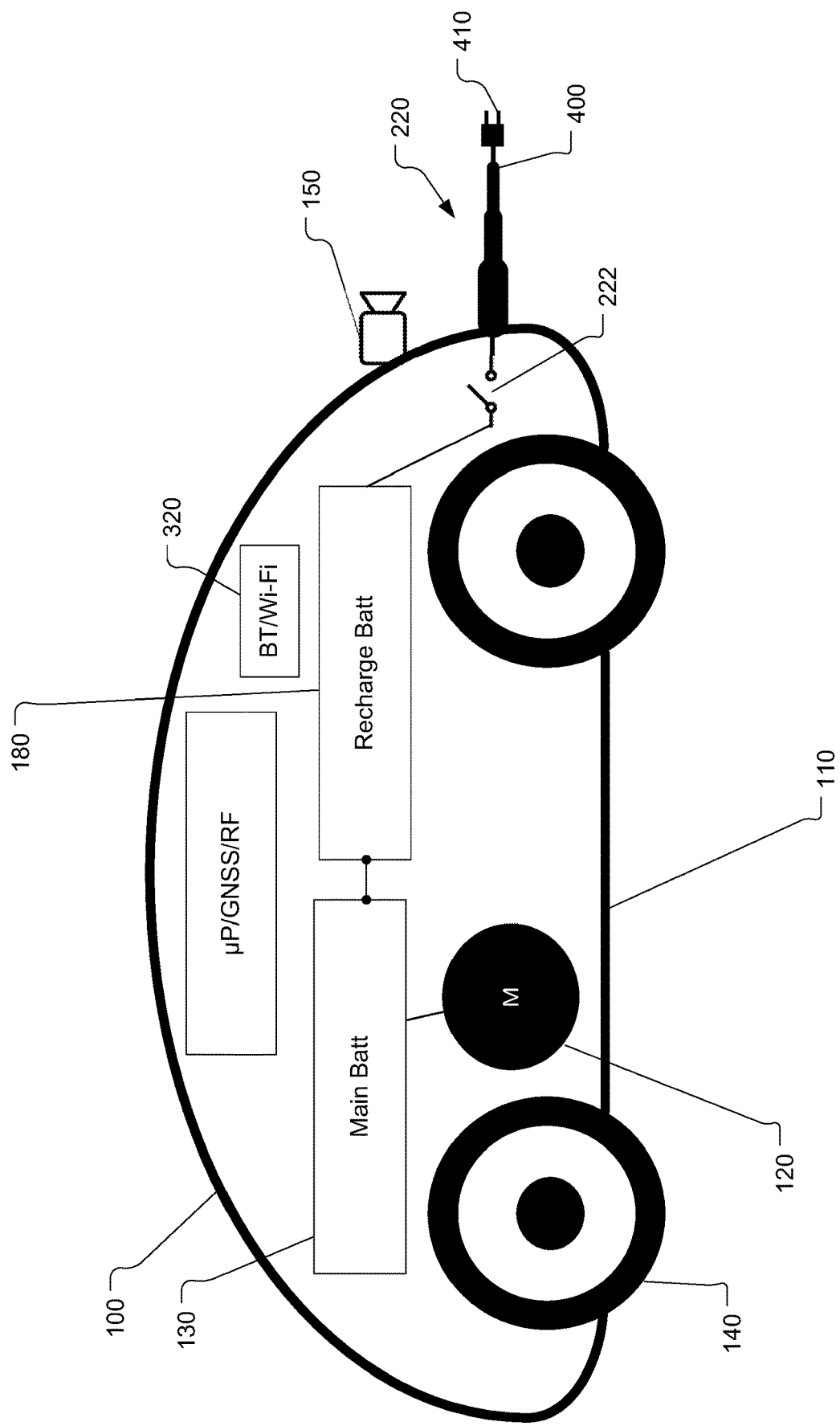
FIG. 18 depicts an unmanned autonomous recharging vehicle having a telescopic probe for extending and retracting to connect to the socket of the EV.

In one embodiment, as depicted in FIG. 18, the electric power transfer device 220 of the unmanned autonomous recharging vehicle 100 is a telescopic probe 400 that extends to connect an electrical plug 410 of an electrically conductive wire or conductor extending through the probe into the socket 80 of the electric vehicle 10 using a machine-vision guidance system (provided by the camera 150 and the processor 170 and a machine-vision and guidance algorithm for controlling the probe 400). The probe may be a boom or other extendable member.

Figure 19:
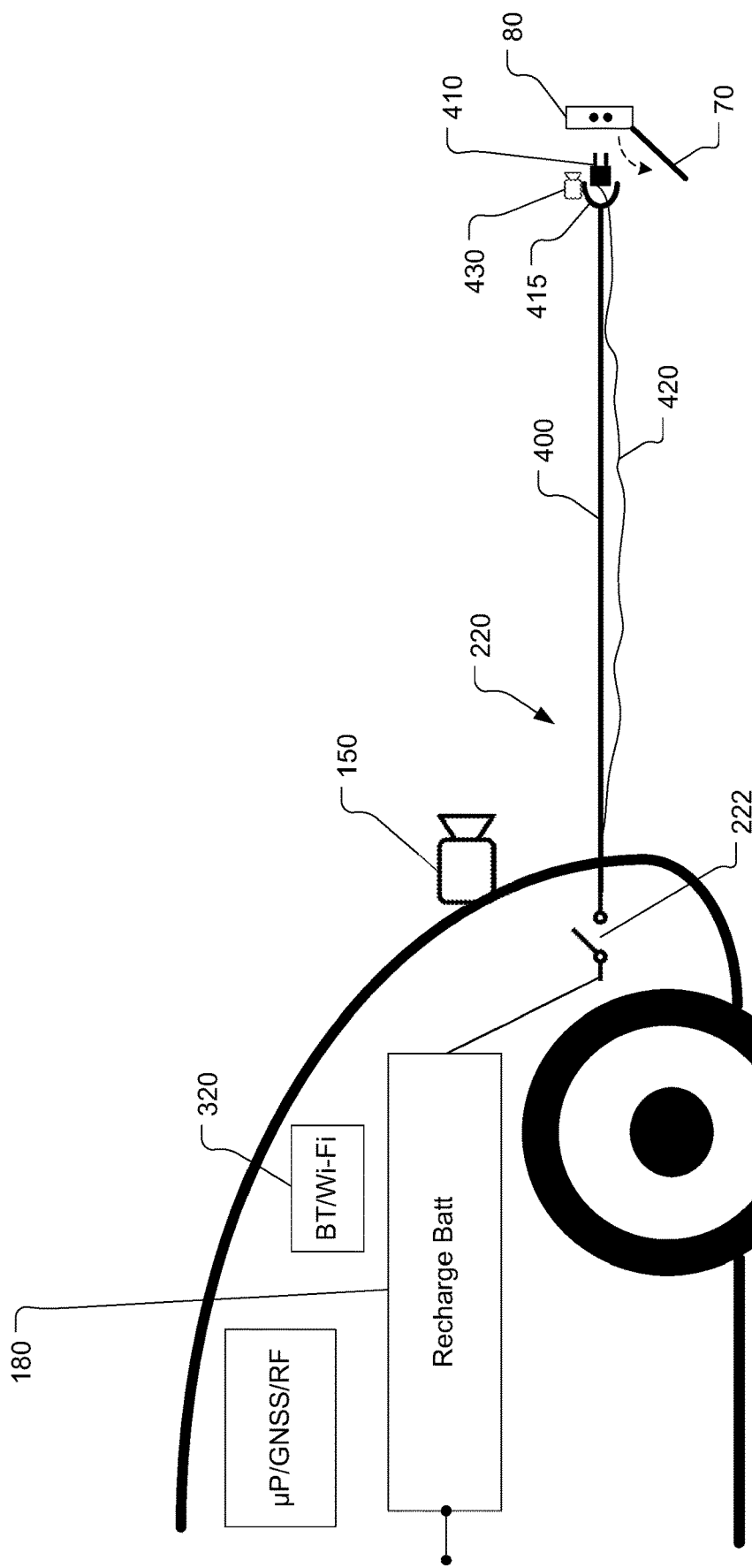
FIG. 19 depicts an unmanned autonomous recharging vehicle having a robotic probe with a gripper for carrying a cable and also having an end effector camera to guide the plug and optional adaptor at the end of the cable into the socket.

In one embodiment, as depicted in FIG. 19, the probe 400 is a robotic probe having a gripper 415 for gripping and carrying the electrically conductive cable 420. The robotic probe may have an end effector camera 430 to guide the adaptor or plug into the socket, wherein the robotic probe 400 is retractable to leave the charging cable 420 and its plug/adaptor connected to the socket 80. Since the charging cable 420 is flexible, the UARV 100 is able to turn corners while charging the EV 10. The cable should not be taut and thus may hang loosely without touching the ground thereby providing some horizontal slack to account for variations in the gap between the UARV and EV when tethered.

When tethered together by the cable for recharging, the UARV and EV may synchronize autonomous driving control to minimize the risk of excessive separation or collision. In one embodiment, the UARV connects the plug into a front socket on the front of the EV and thus travels ahead of the EV. In another embodiment, the UARV connects the plug into a rear socket on the rear of the EV and thus travels behind the EV. In these embodiments, the UARV and EV travel in the same lane, i.e. one in front of the other. In these embodiments, the EV has a front socket disposed along the front of the EV e.g. in the front bumper, in a front portion of the body, etc. Likewise, the EV has a rear socket disposed along the rear of the EV e.g. in the rear bumper, in a rear portion of the body, etc. Although independent autonomous driving can be performed with the rear vehicle using an adaptive cruise control to keep a fixed distance behind the front vehicle, it is more advantageous to use a master-slave protocol to allow one of the two vehicles to control the other when charging. In one embodiment, the autonomous driving processor 170 of the UARV transmits autonomous driving commands to the electric vehicle 10 such that the unmanned autonomous recharging vehicle 100 controls steering, braking and acceleration of the electric vehicle 10. In an alternate embodiment, the autonomous driving processor 170 of the UARV 100 receives autonomous driving commands from the electric vehicle 10 such that the electric vehicle 10 controls steering, braking and acceleration of the unmanned autonomous recharging vehicle 100. In a variant, the EV and UARV may negotiate which is to take control of driving.

In most instances, the EV and UARV remain tethered during the complete time needed to recharge the EV. However, if the EV wishes to terminate recharging for any reason, e.g. an emergency, a change of travel plans, etc., the EV may communicate a termination message to the UARV. The probe 400 extends to grasp the plug/adaptor 410 and/or the cable 420 to disconnect the plug/adaptor 410 from the socket 80, and then retracts with the cable 420 and plug/ adaptor 410. In an exceptional scenario, the EV may divert from the agreed-upon recharging path. If this occurs, the UARV may wish to discontinue recharging and disconnect from the EV.

In one embodiment, the processor 170 cooperates with the radiofrequency transceiver 190 to send a warning to the electric vehicle 10 if the electric vehicle diverts from a negotiated recharging path.

In one embodiment, the processor 170 causes the probe 400 to disconnect from the socket 80 if the electric vehicle 10 diverts from a negotiated recharging path.

Figure 20:
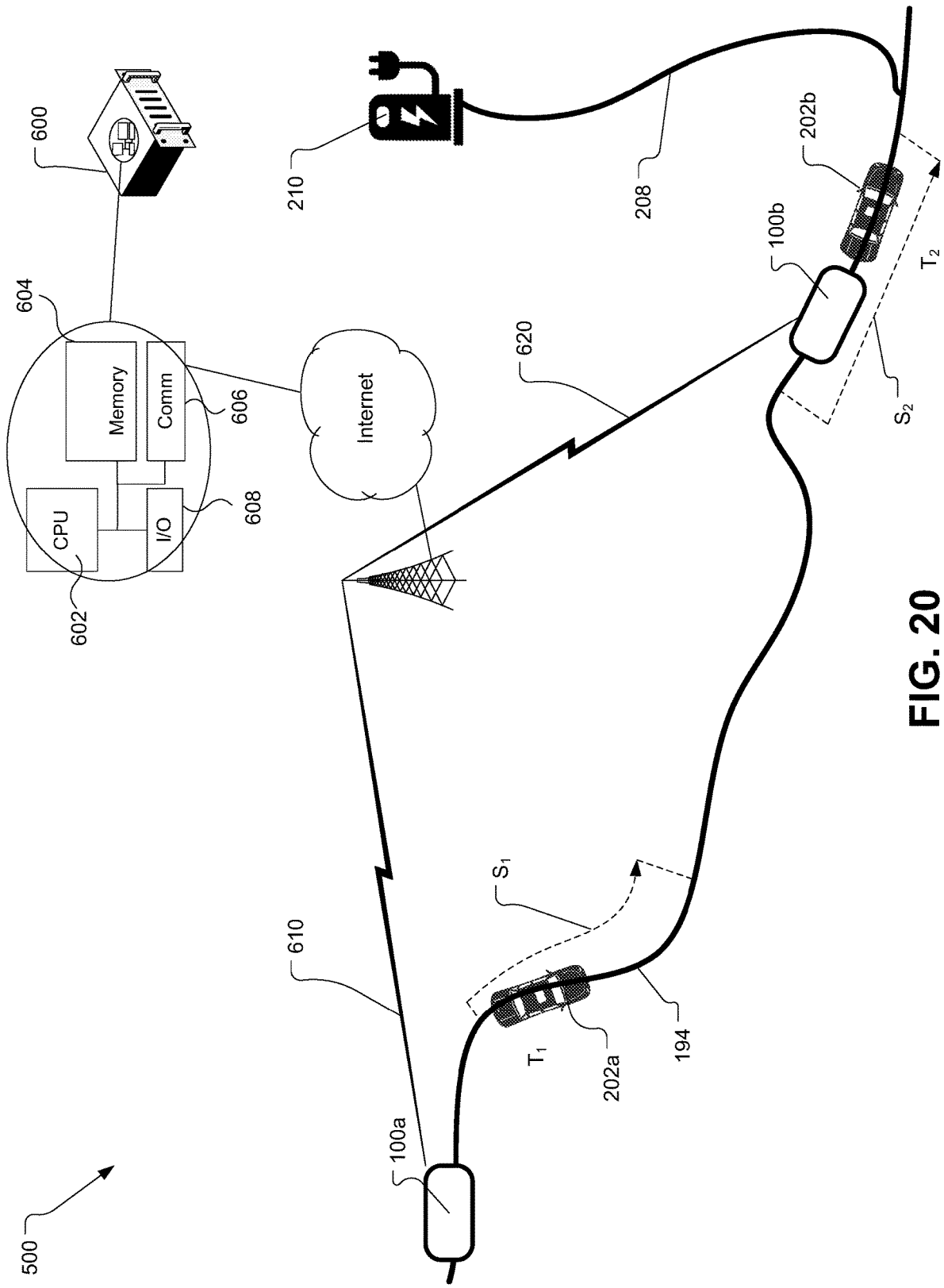
FIG. 20 depicts a vehicle recharging system in which the dispatch server dispatches a first UARV to a first rendezvous location and dispatches a second UARV to a second rendezvous location for recharging the EV at first and second points along the projected route.

In accordance with another aspect, a vehicle recharging system 500 is depicted in FIG. 20. The vehicle recharging system 500 is capable of recharging a partially depleted battery of an electric vehicle 10 while the electric vehicle is driving. The vehicle recharging system 500 includes a dispatch server 600 having a server processor (e.g. CPU) 602, a server memory 604 and a server communication port 606 for receiving a projected route 194 from the electric vehicle 10 and a first segment $S_1$ along the projected route 194 where the partially depleted battery of the electric vehicle 10 is to be recharged a first time $T_1$ and a second segment $S_2$ further along the projected route 194 where the partially depleted battery of the electric vehicle 10 is to be recharged a second time $T_2$. The server 600 may also include an input/output (I/O) device 608.

As depicted by way of example in FIG. 20, the system 500 includes a first unmanned autonomous recharging vehicle (UARV) 100a for receiving from the dispatch server 600 a first dispatch message 610 comprising a first rendezvous location 202a along the first segment $S_1$ of the projected route 194 for recharging the electric vehicle 10 the first time. The system 500 also includes a second unmanned autonomous recharging vehicle (UARV) 100b for receiving from the dispatch server 500 a second dispatch message 620 comprising a second rendezvous location 202b along the second segment $S_2$ of the projected route 194 for recharging the electric vehicle 10 the second time. Between the first and second times, the EV 10 has traveled along the route 194 and has once again partially depleted its battery.

If the first UARV 100a is delayed, e.g. due to unexpectedly slower traffic, the first UARV 100a notifies the dispatch server 600 in one embodiment. In this embodiment, the dispatch server 600 is configured to automatically track the location of the UARV 100a and notes that the first UARV 100a is delayed. Due to the delay, it becomes inefficient to recharge the EV 10 at the second rendezvous location because the battery of the EV 10 will not be as depleted as it would have been had the first UARV 100a recharged the EV 10 at the originally determined first rendezvous location. The dispatch server 600 thus adjust the second rendezvous location to make it further down the route.

Figure 21:
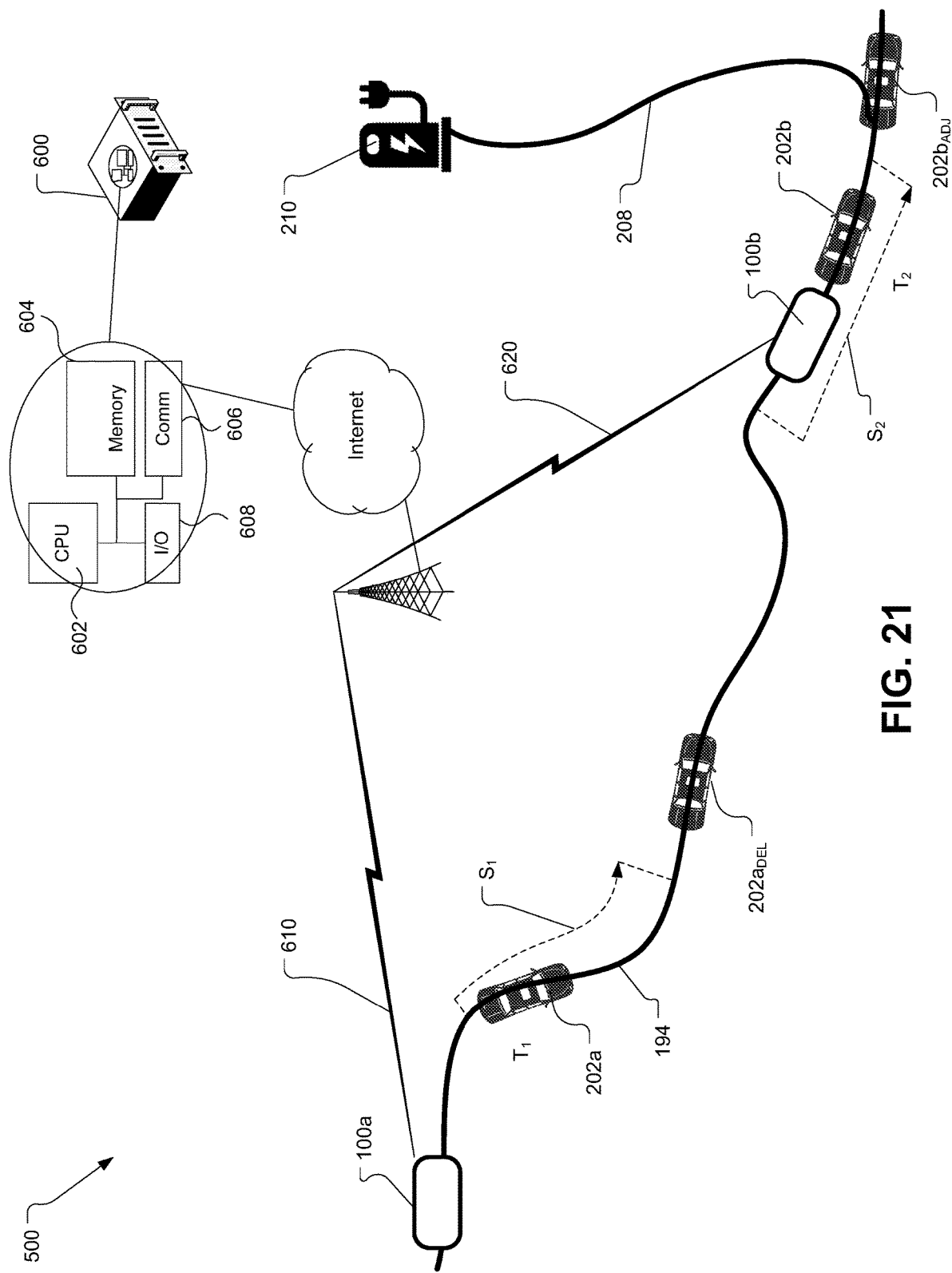
FIG. 21 depicts a vehicle recharging system in which the first UARV is delayed in reaching the first rendezvous location whereby the dispatch server communicates an adjusted second rendezvous location to the second UARV.

In this embodiment, as depicted in FIG. 21, the dispatch server 600 determines an adjusted second rendezvous location $202b_{ADJ}$ for the second UARV 100b in response to determining that the first UARV 100a is delayed and will intercept the electric vehicle 10 at a delayed first rendezvous location $202a_{DEL}$. In one particular embodiment, the dispatch server 600 determines if the second UARV 100b still has sufficient range to recharge the electric vehicle 10 when commencing the recharging session at the adjusted second rendezvous location $202b_{ADJ}$. In this embodiment, the dispatch server 600 is configured to transmit the adjusted second rendezvous location $202b_{ADJ}$ to the second UARV 100b to instruct the second UARV 100b to intercept the electric vehicle 10 at the adjusted second rendezvous location $202b_{ADJ}$.

Figure 22:
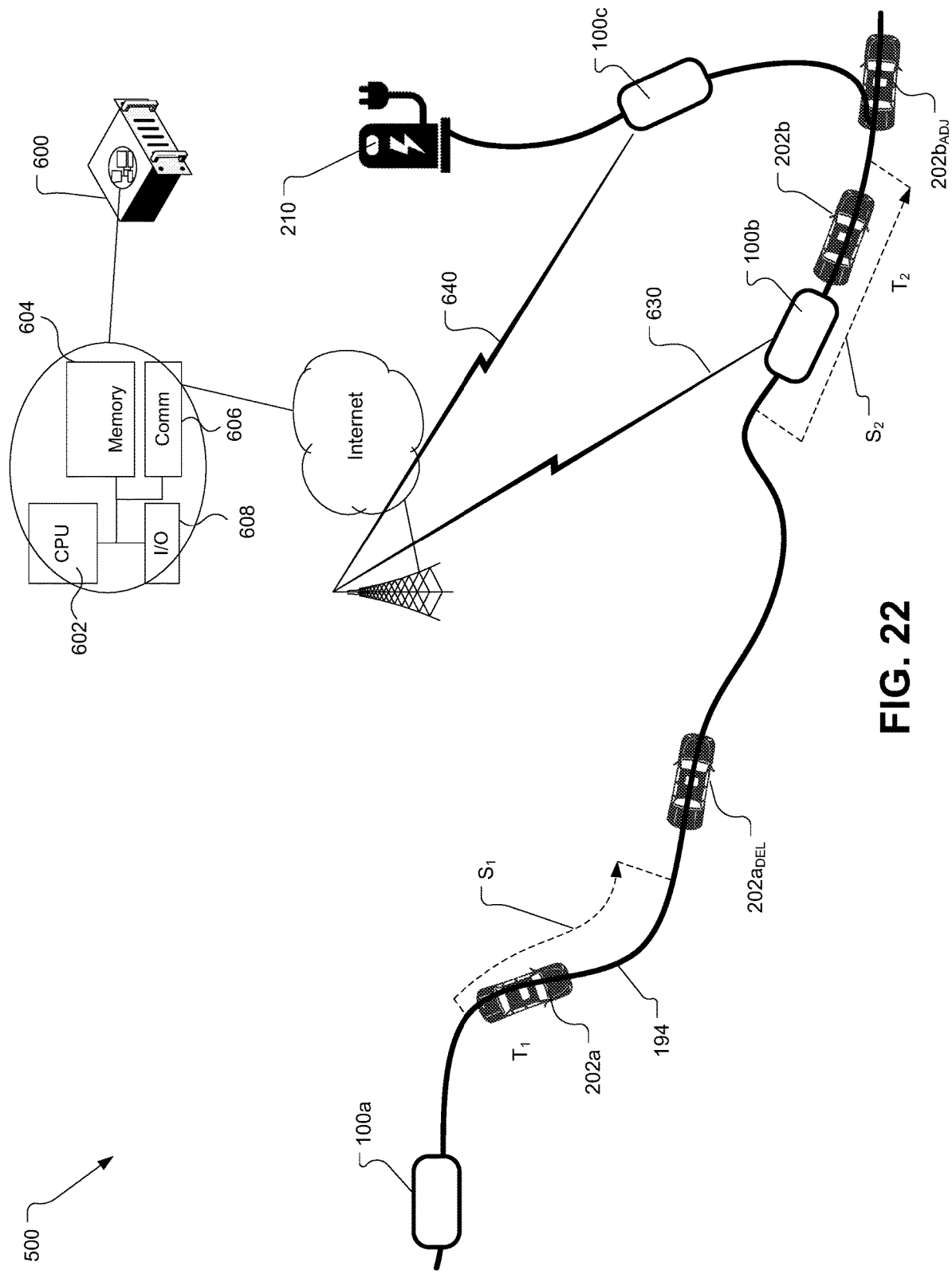
FIG. 22 depicts a vehicle recharging system in which the dispatch server sends a request to a third UARV to recharge the EV at the adjusted second rendezvous location instead of the second UARV.

In one embodiment, as depicted by way of example in FIG. 22, the dispatch server 600 is configured to determine whether the second UARV 100b has sufficient range to recharge the EV 10. Upon determining that the second UARV 100b has insufficient range, the dispatch server 600 communicates a cancellation message 630 to the second UARV 100b and communicates a request 640 to a third UARV 100c to intercept the electric vehicle 10 at the adjusted second rendezvous location $202b_{ADJ}$.

Figure 23:
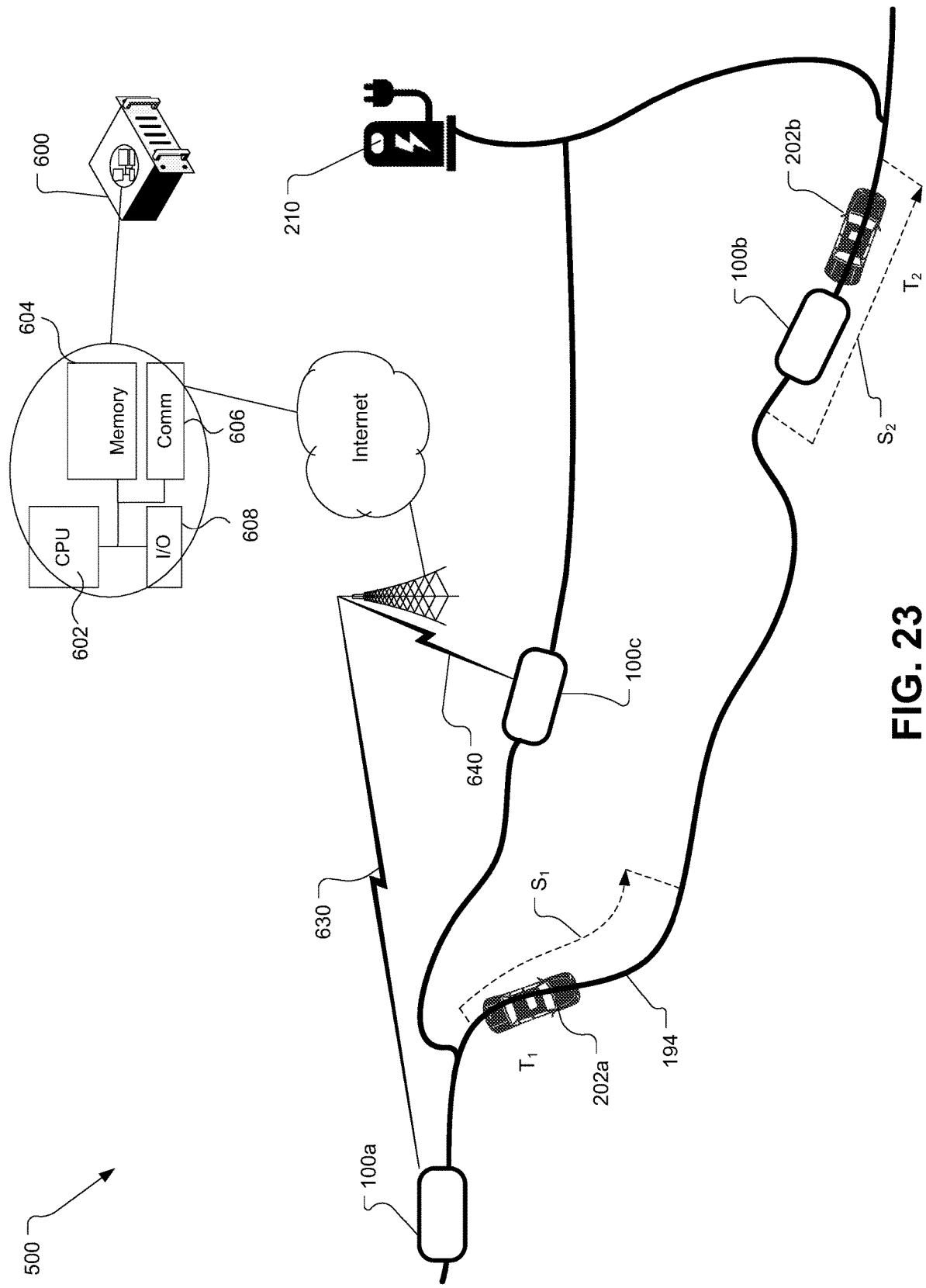
FIG. 23 depicts a vehicle recharging system in which the dispatch server sends a request to a third UARV to recharge the EV at the first rendezvous location instead of the first UARV.

In another embodiment, which is depicted by way of example in FIG. 23, the dispatch server 600, upon determining that the first UARV 100a is delayed in reaching the first rendezvous location 202a, communicates a cancellation message 630 to the first UARV 100a and communicates a request 640 to a third UARV 100c to intercept the electric vehicle 10 at the first rendezvous location 202a.

The system 500 may be used to make reservations for recharging along a projected route. For example, this is particularly useful for electric trucks to reserve recharging sessions along a route when making a long-haul journey. Likewise, when a user is planning to depart on a long road trip in an electric car, minivan, SUV, etc, the user may reserve multiple UARV's along the route which are scheduled to meet and recharge the EV at points along the route, thereby minimizing the likelihood that the EV needs to pull into an electric recharging station and wait for the EV to be recharged.

Figure 24:
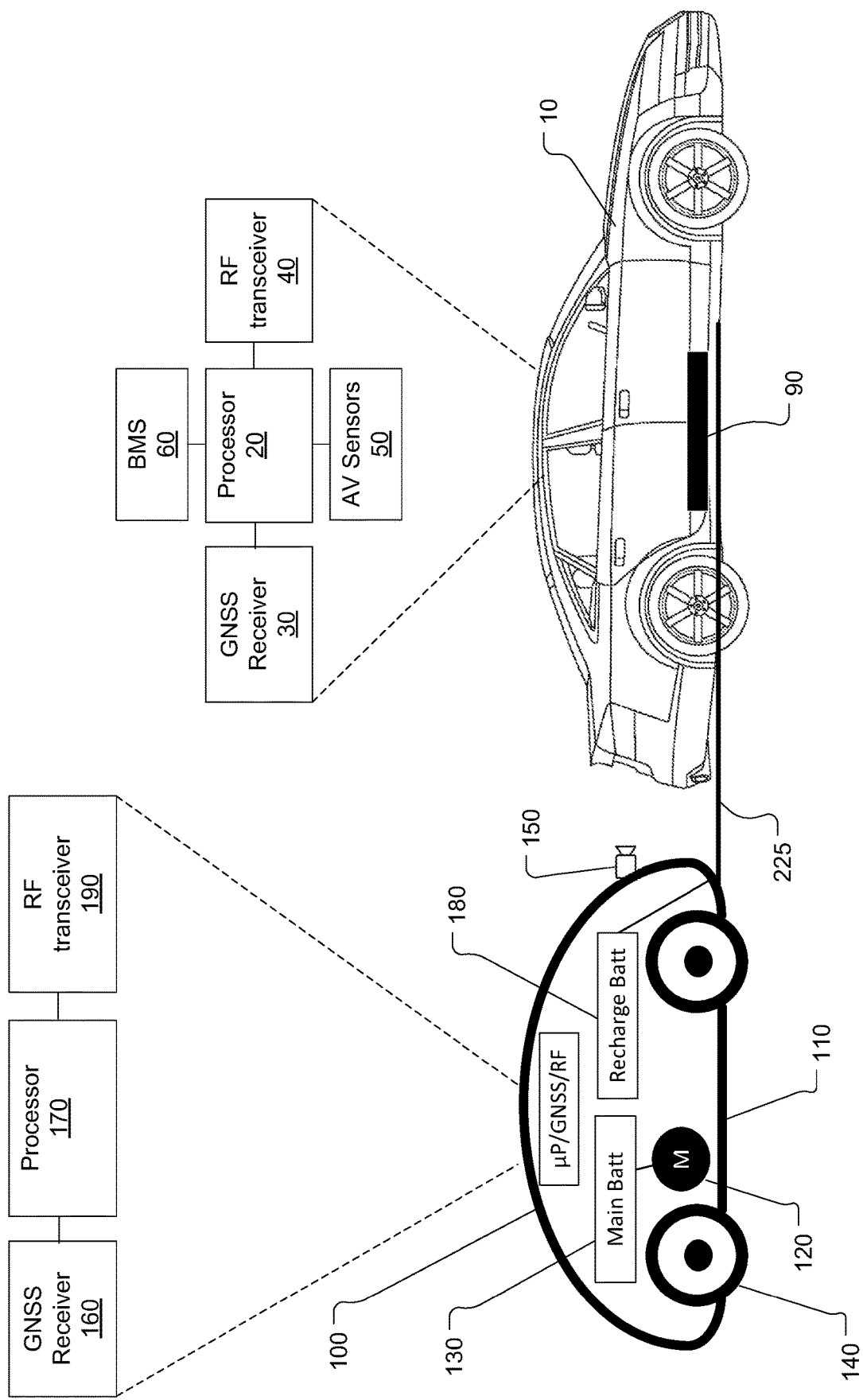
FIG. 24 depicts a UARV having a wireless power transfer device to wirelessly recharge the EV.

In another implementation, the UARV may have a wireless power transfer (WPT) device to wirelessly recharge the EV, e.g. the UARV may have an inductive recharger to inductively recharge the EV. A WPT recharger is depicted in the embodiment of FIG. 24. In the embodiment of FIG. 24, the UARV has a WRT recharger 225 that is extended underneath the EV, e.g. underneath the partially depleted battery 90 of the EV to wirelessly recharge the partially depleted battery 90 of the EV.

In another aspect, a method of recharging a partially depleted battery of a moving electric vehicle is disclosed. The method may be performed by an unmanned autonomous recharging vehicle. The method entails receiving a recharging request from the electric vehicle, the recharging request comprising a projected route for the electric vehicle, battery status information for the partially depleted battery and time information indicating when the electric vehicle is traversing the projected route. The method entails processing, e.g. with a processor, the recharging request data to determine a rendezvous location along the projected route, an estimated recharging time to recharge the electric vehicle, a predicted disconnection point along the projected route where charging is predicted to be complete, and a return path from the predicted disconnection point to an electric charging station where the unmanned autonomous recharging vehicle can recharge the recharging battery. The method further entails determining if the unmanned autonomous recharging vehicle has sufficient energy supply to recharge the electric vehicle and return to the electric charging station. The method also entails transferring electric power from the recharging battery of the unmanned autonomous recharging vehicle to the partially depleted battery of the electric vehicle.

In accordance with another aspect, a method of recharging a partially depleted battery of an electric vehicle while the electric vehicle is driving is disclosed. This method entails receiving a projected route from the electric vehicle and a first segment along the route where the partially depleted battery of the electric vehicle is to be recharged a first time and a second segment further along the route where the partially depleted battery of the electric vehicle is to be recharged a second time. The method entails dispatching a first unmanned autonomous recharging vehicle (UARV) to a first rendezvous location along the first segment of the projected route for recharging the electric vehicle the first time. The method also entails dispatching a second unmanned autonomous recharging vehicle (UARV) to a second rendezvous location along the second segment of the projected route for recharging the electric vehicle the second time.

In one embodiment, the method entails determining an adjusted second rendezvous location for the second UARV in response to determining that the first UARV is delayed and will intercept the electric vehicle at a delayed first rendezvous location.

In one embodiment, the method entails determining if the second UARV still has sufficient range to recharge the electric vehicle when commencing at the adjusted second rendezvous location.

In one embodiment, the method entails transmitting the adjusted second rendezvous location to the second UARV to instruct the second UARV to intercept the electric vehicle at the adjusted second rendezvous location.

These methods can be implemented in hardware, software, firmware or as any suitable combination thereof. That is, if implemented as software, the computer-readable medium comprises instructions in code which when loaded into memory and executed on a processor of a computing device causes the computing device to perform any of the foregoing method steps. These method steps may be implemented as software, i.e. as coded instructions stored on a computer readable medium which performs the foregoing steps when the computer readable medium is loaded into memory and executed by the microprocessor of the computing device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many variations, refinements and modifications may be made without departing from the inventive concepts presented in this application. The scope of the exclusive right sought by the Applicant(s) is therefore intended to be limited solely by the appended claims.

The invention claimed is:

1. An unmanned autonomous recharging vehicle for recharging a partially depleted battery of a moving electric vehicle, the unmanned autonomous recharging vehicle comprising:
a chassis;
a power plant supported by the chassis;
an energy supply supported by the chassis for supplying energy to the power plant;
a plurality of wheels rotationally mounted to the chassis, at least one of which is powered by the power plant;
a plurality of sensors for sensing surroundings of the unmanned autonomous recharging vehicle to enable road tracking and collision avoidance;
a global navigation satellite system (GNSS) receiver for determining a current location of the unmanned autonomous recharging vehicle to enable navigation;
an autonomous driving processor coupled to the plurality of sensors and to the GNSS receiver for autonomously driving the unmanned autonomous recharging vehicle;
a recharging battery supported by the chassis, wherein the recharging battery stores an electric charge for recharging the partially depleted battery of the electric vehicle;
a radiofrequency transceiver to receive a recharging request from the electric vehicle, the recharging request comprising a projected route for the electric vehicle, battery status information for the partially depleted battery and time information indicating when the electric vehicle is traversing the projected route;
a processor communicatively coupled to the radiofrequency transceiver to receive and process the recharging request data to determine a rendezvous location along the projected route, an estimated recharging time to recharge the electric vehicle, a predicted disconnection point along the projected route where charging is predicted to be complete, and a return path from the predicted disconnection point to an electric charging station where the unmanned autonomous recharging vehicle can recharge the recharging battery, and wherein the processor determines if the unmanned autonomous recharging vehicle has sufficient energy supply to recharge the electric vehicle and return to the electric charging station; and
an electric power transfer device connected to the recharging battery and having a switch to transfer electric power from the recharging battery of the unmanned autonomous recharging vehicle to the partially depleted battery of the electric vehicle.

2. The unmanned autonomous recharging vehicle of claim 1 wherein the processor is configured to cause the radiofrequency transceiver to transmit the rendezvous location and the predicted disconnection point to the electric vehicle based on real-time traffic data and to receive a confirmation in reply from the electric vehicle.

3. The unmanned autonomous recharging vehicle of claim 1 wherein the processor is configured to cause the radiofrequency transceiver to transmit a detour proposal as an alternate route to the electric vehicle to minimize energy consumption to enable the unmanned autonomous recharging vehicle to return to the electric charging station and to receive a detour confirmation from the electric vehicle that the electric vehicle will take a detour.

4. The unmanned autonomous recharging vehicle of claim 1 wherein the processor causes the radiofrequency transceiver to broadcast availability in a geographical location and connection types.

5. The unmanned autonomous recharging vehicle of claim 4 wherein the processor causes the radiofrequency transceiver to also broadcast a recharging price.

6. The unmanned autonomous recharging vehicle of claim 1 wherein the processor receives via the radiofrequency transceiver multiple recharge requests from multiple electric vehicles and determines which one of the multiple electric vehicles to recharge based on price and travel time to the rendezvous location.

7. The unmanned autonomous recharging vehicle of claim 1 wherein the electric power transfer device comprises a front connector forwardly extendable from a front portion of the unmanned autonomous recharging vehicle and a rear connector rearwardly extendable from a rear portion of the unmanned autonomous recharging vehicle.

8. The unmanned autonomous recharging vehicle of claim 1 comprising a short-range wireless transceiver for communicating a connection request message to the electric vehicle to request that a flap covering an electrical socket be opened.

9. The unmanned autonomous recharging vehicle of claim 8 comprising a camera to visually detect that the flap is open.

10. The unmanned autonomous recharging vehicle of claim 9 wherein the camera provides image data to the processor to enable the processor to verify a type of socket on the electric vehicle.

11. The unmanned autonomous recharging vehicle of claim 10 wherein the processor selects an adaptor from a plurality of adaptors to connect to the socket.

12. The unmanned autonomous recharging vehicle of claim 11 wherein the electric power transfer device is a probe that extends to connect with the socket of the electric vehicle.

13. The unmanned autonomous recharging vehicle of claim of claim 12 wherein the probe is a robotic probe carrying a charging cable and having an end effector camera to guide the adaptor into the socket, wherein the robotic probe is retractable to leave the charging cable between the socket and the unmanned autonomous recharging vehicle.

14. The unmanned autonomous recharging vehicle of claim 1 wherein the autonomous driving processor transmits autonomous driving commands to the electric vehicle such that the unmanned autonomous recharging vehicle controls steering, braking and acceleration of the electric vehicle.

15. The unmanned autonomous recharging vehicle of claim 1 wherein the autonomous driving processor receives autonomous driving commands from the electric vehicle such that the electric vehicle controls steering, braking and acceleration of the unmanned autonomous recharging vehicle.

16. The unmanned autonomous recharging vehicle of claim 1 wherein the processor cooperates with the radiofrequency transceiver to send a warning if the electric vehicle diverts from a negotiated recharging path.

17. The unmanned autonomous recharging vehicle of claim 1 wherein the processor causes the probe to disconnect from the socket if the electric vehicle diverts from a negotiated recharging path.

* * * * *